[11] 3,613,659

[72] Inventor Robert M. Phillips
326 Lakeview Way, Redwood City, Calif. 94062
[21] Appl. No. 767,072
[22] Filed Oct. 14, 1968
[45] Patented Oct. 19, 1971

[54] SOLAR-ENERGY-CONCENTRATING DEVICE
47 Claims, 54 Drawing Figs.
[52] U.S. Cl. .................................................. 126/270,
250/203, 350/1, 350/292
[51] Int. Cl. ........................................................ F24j 3/02
[50] Field of Search ........................................... 126/270, 271; 350/292

[56] References Cited
UNITED STATES PATENTS
| | | | |
|---|---|---|---|
| 1,951,404 | 3/1934 | Goddard | 126/270 |
| 2,770,229 | 11/1956 | Tarcici | 126/270 UX |
| 2,846,724 | 8/1958 | Aylwin | 126/270 X |
| 2,859,745 | 11/1958 | Von Brudersdorff | 126/270 |
| 2,945,417 | 7/1960 | Caryl et al. | 126/270 |
| 3,049,055 | 8/1962 | Tubbs | 126/270 X |
| 3,106,201 | 10/1963 | Steinberg | 126/270 X |
| 3,391,688 | 7/1968 | Dery | 126/270 |

FOREIGN PATENTS
| | | | |
|---|---|---|---|
| 751,050 | 6/1956 | Great Britain | 126/270 |

*Primary Examiner*—Charles J. Myhre
*Attorney*—John J. Leavitt

ABSTRACT: Presented is a solar-energy-concentrating device in which a reflector-concentrator panel is supported in such manner that radiant solar energy is intercepted by the reflector-concentrator panel and reflected onto a proportionately smaller radiant-energy-absorbing surface. The radiant-energy-absorbing surface and concentrator panel are supported in relation to each other so that the shadow cast by the radiant-energy-absorbing surface typically does not fall upon the reflective surface of the concentrator panel so as to preclude interference with reflection of radiant energy thereby. The concentrator panel may be in the form of a single module having a concentration ratio with respect to the radiant-energy-absorbing surface ranging between 6½–12 to 1, and preferably closely approximating 10 to 1; or it may be in the form of a plurality of such modular panels arranged to provide a selected concentration ratio or permit adjustment of the temperature of the absorbing surface through independent adjustment of one or more of the panels. For concentration ratios falling into this preferred range, it has been found that the operating temperature of the radiant-energy-absorbing device or surface will selectively range between 350° F. and 500° F. In another embodiment the reflector-concentrator panel is provided with a reflective surface each increment of which is related to adjacent incremental surface areas so as to provide the desired predetermined concentration ratio. The radiant-energy-absorbing surface may be one surface of a flat plate arranged to absorb the radiant energy from the sun that is reflected to it by the concentrator panel, the heat from which may in turn be utilized for any appropriate purpose requiring a source of heat, as for instance to heat the interior of an oven chamber formed by placing an appropriate cover structure over the plate. The radiant-energy-absorbing surface is supported on a suitable frame in adjustable relation to the reflector-concentrator panel so that in all positions of the frame, giving effect to adjustments required to place the reflecting surface of the concentrator panel in relation to the sun so as to secure maximum efficiency, the radiant-energy-absorbing surface is maintained in a horizontal position so as to conveniently support objects thereon in heat transfer relation to the radiant-energy-absorbing surface.

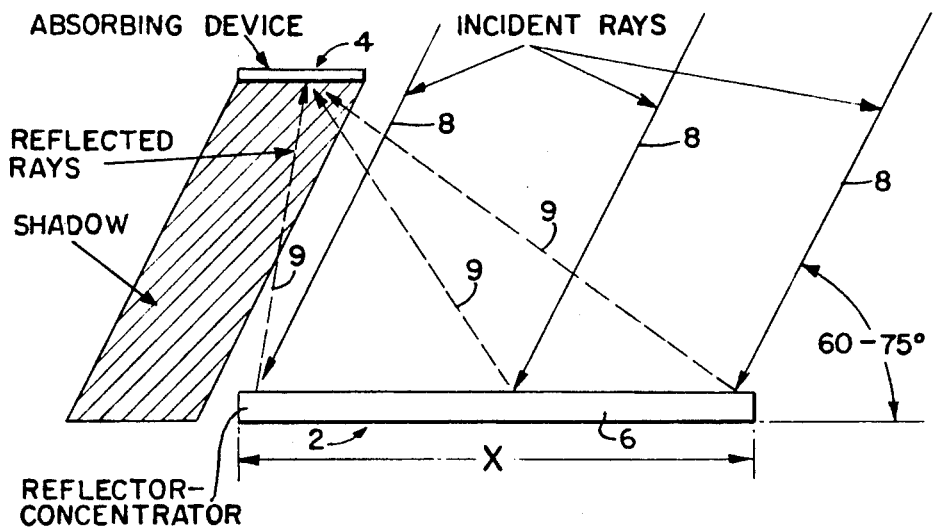
FIG. 1.
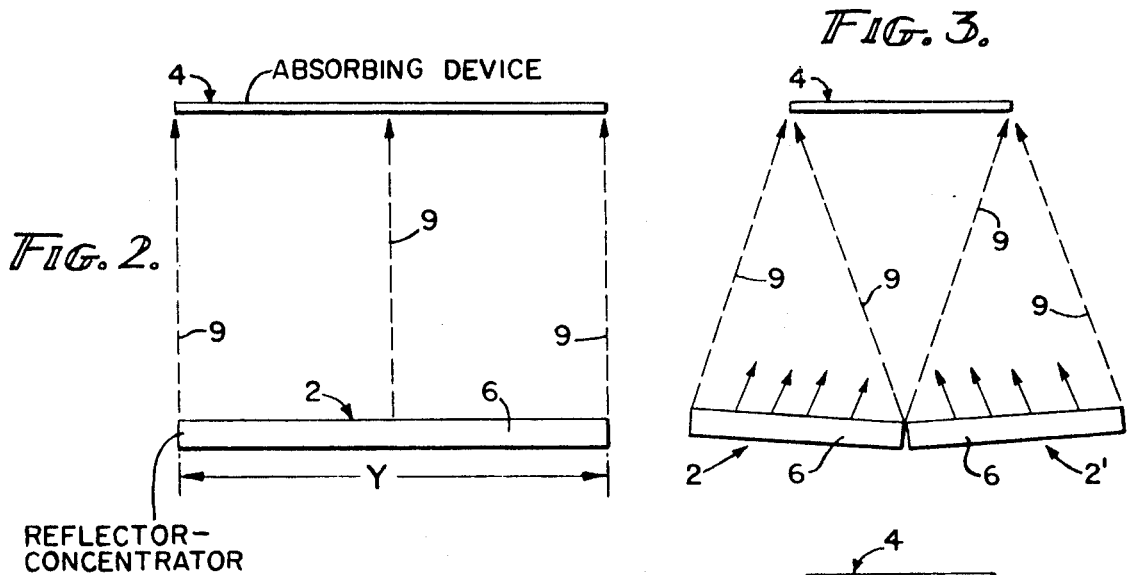
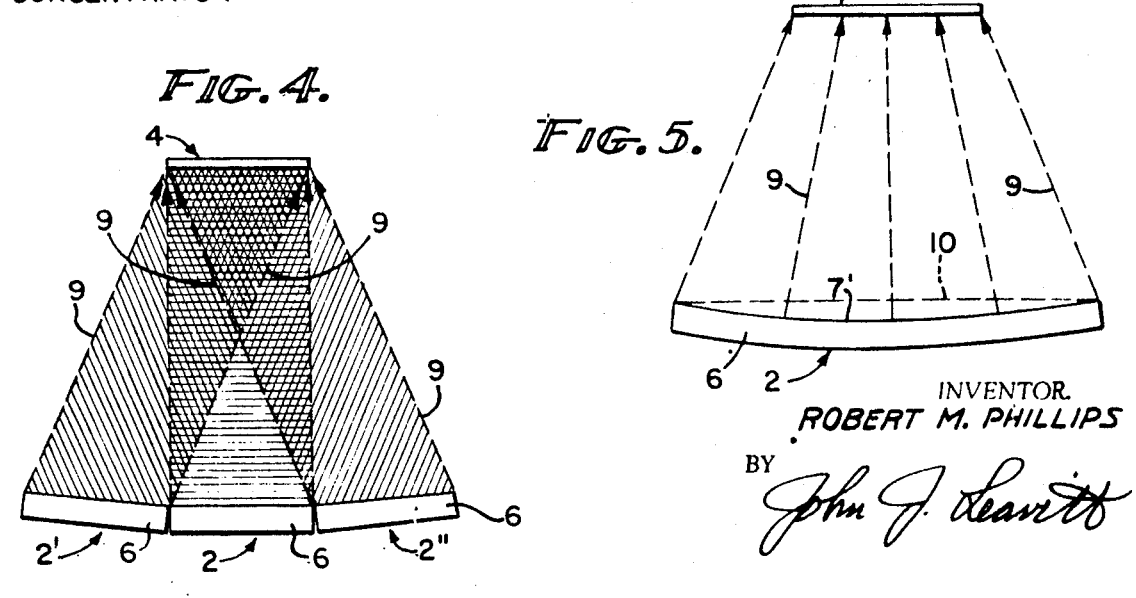
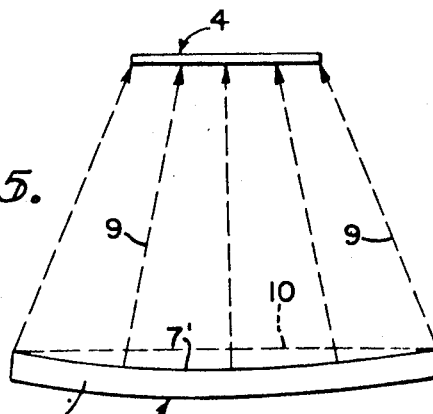
INVENTOR.
ROBERT M. PHILLIPS
BY John J. Leavitt

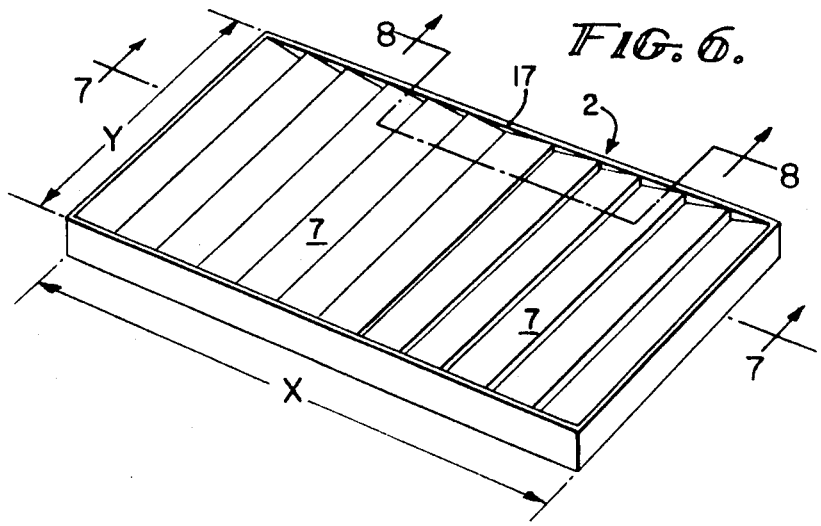
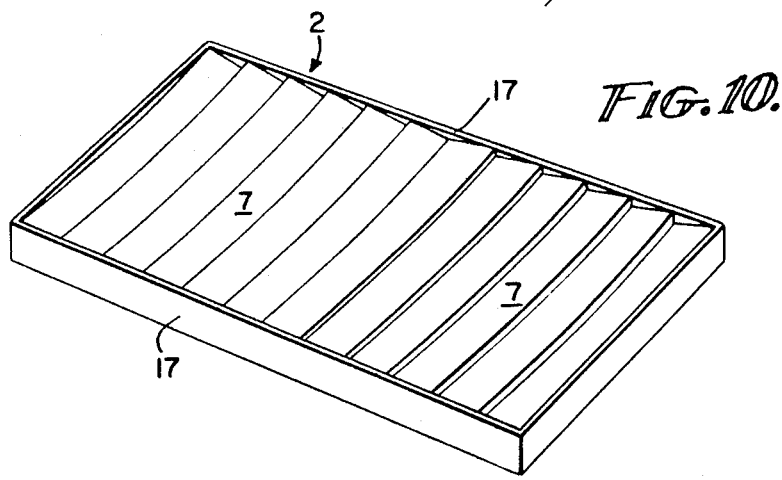
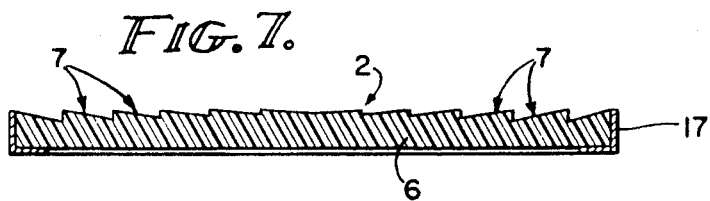
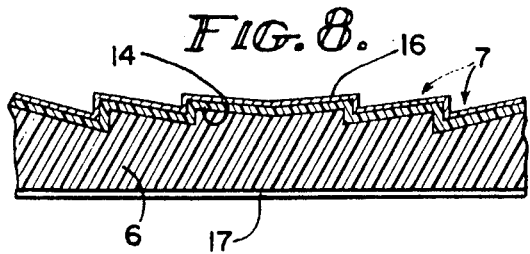
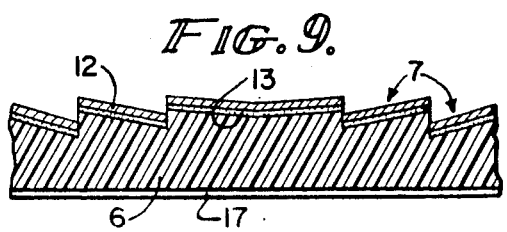
INVENTOR
ROBERT M. PHILLIPS
BY
John J. Leavitt

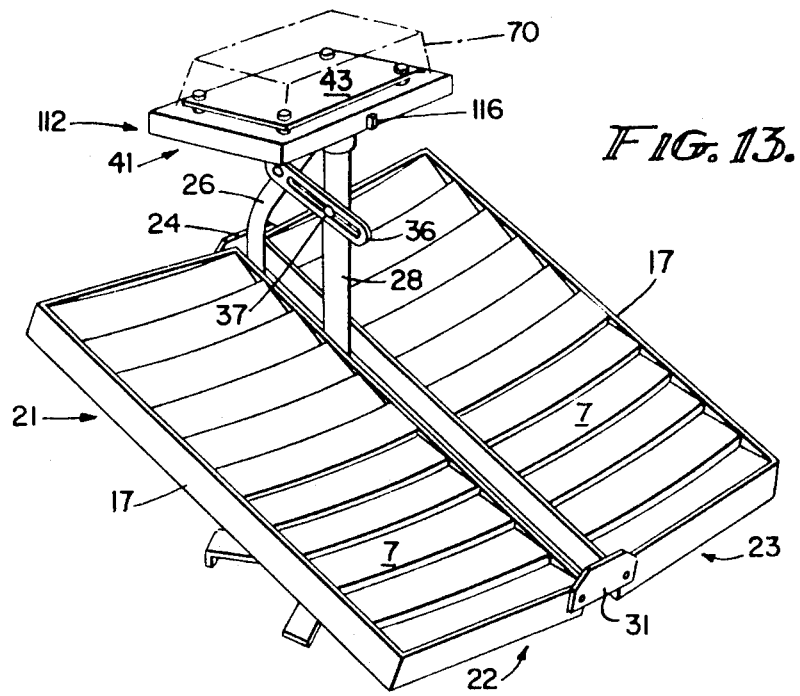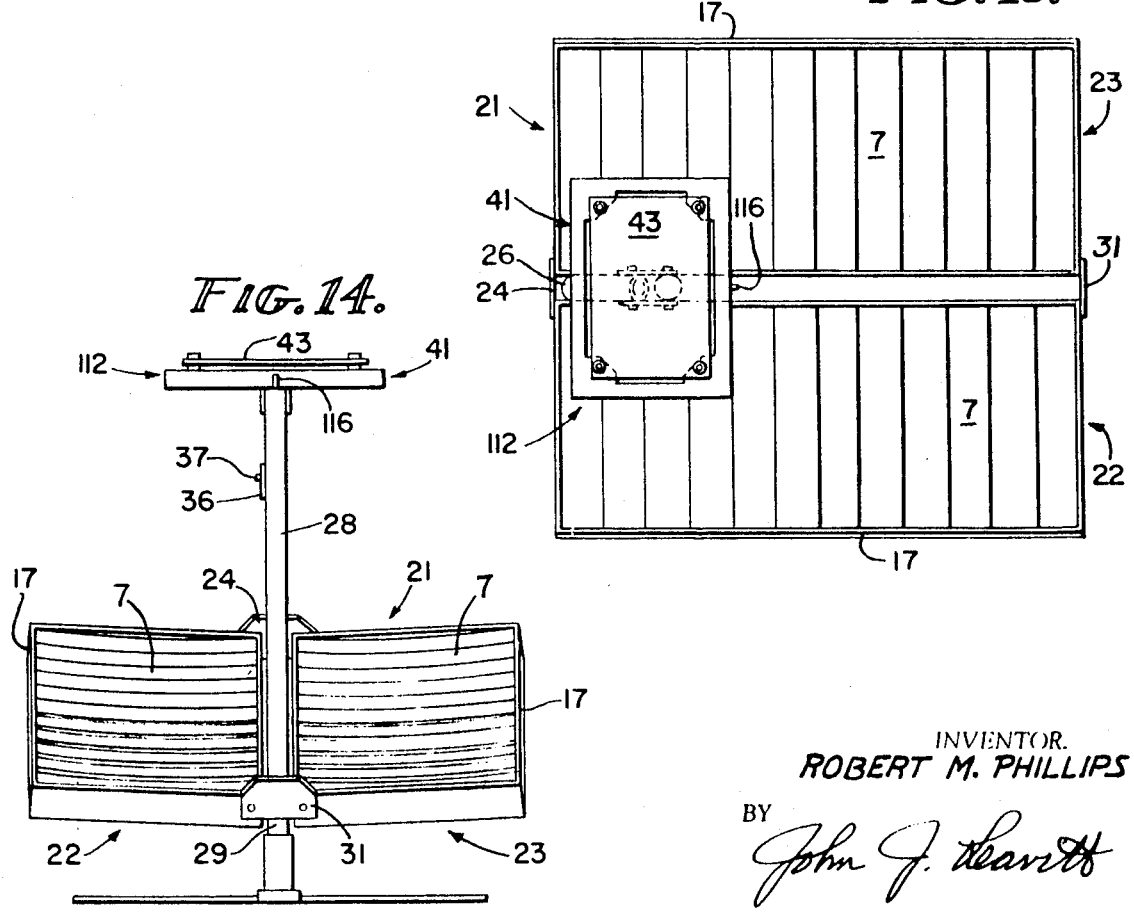

INVENTOR.
ROBERT M. PHILLIPS

INVENTOR.
ROBERT M. PHILLIPS
BY
John J. Leavitt

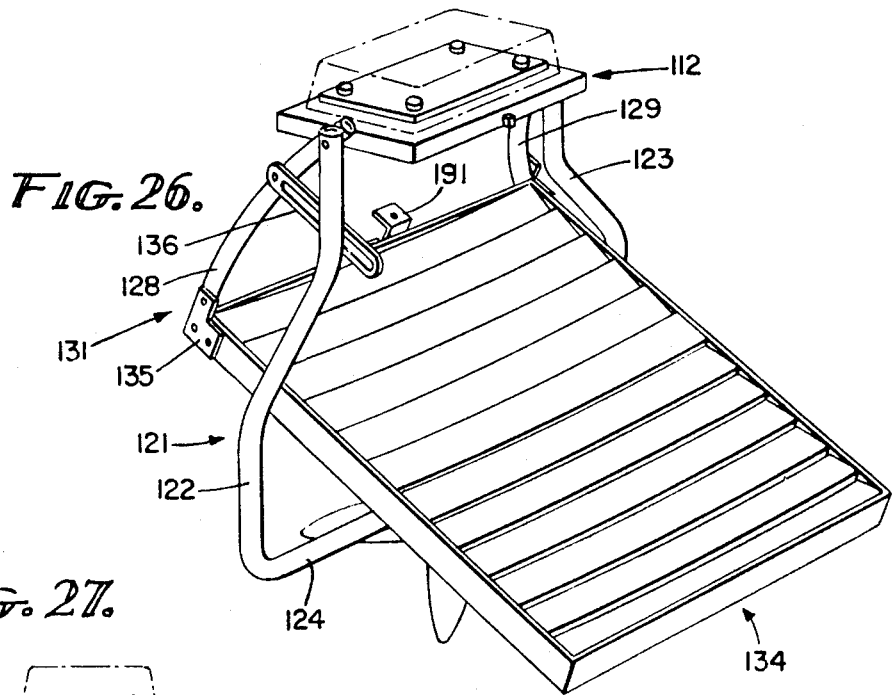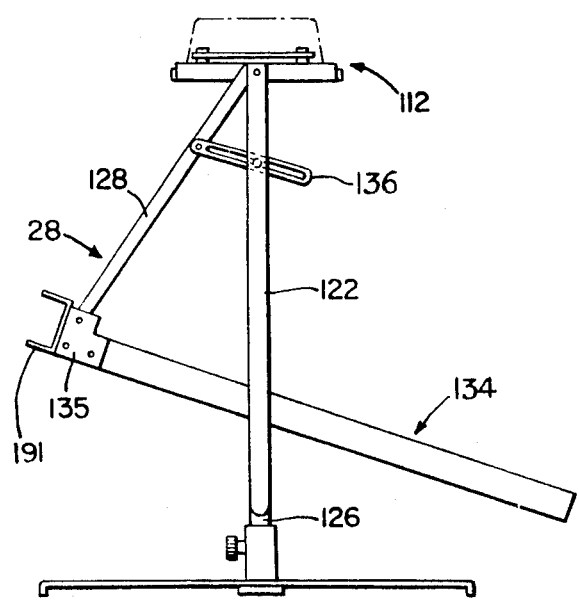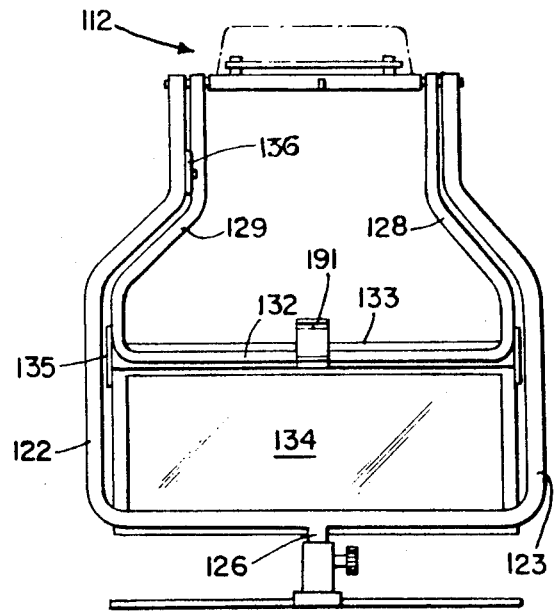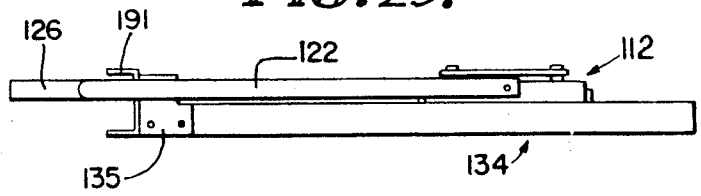

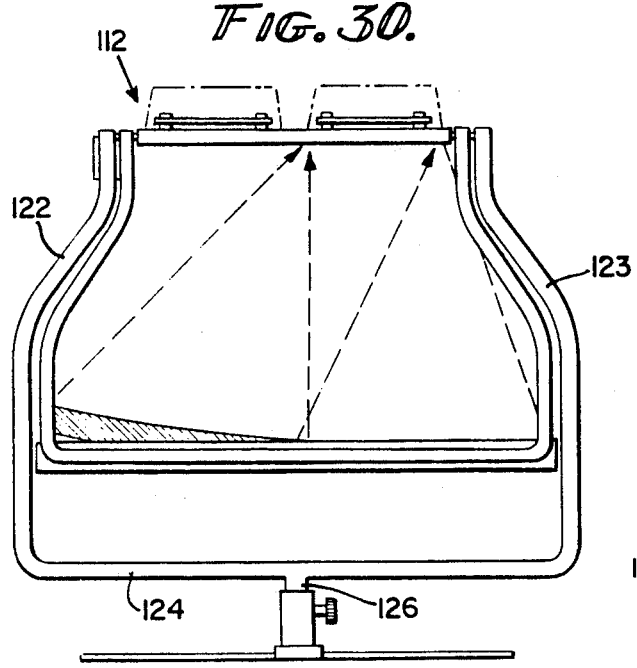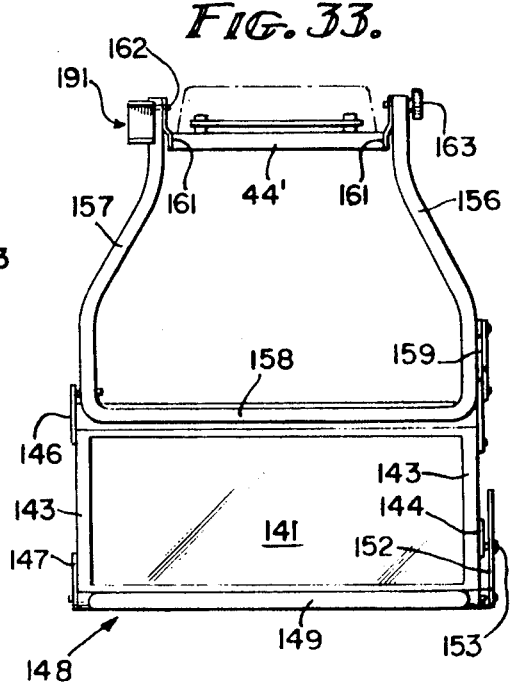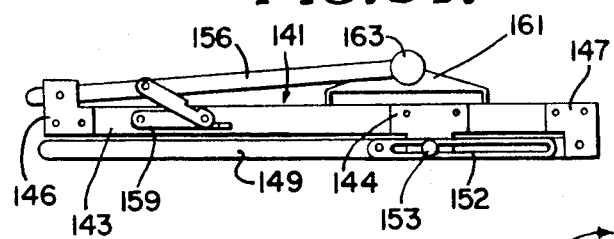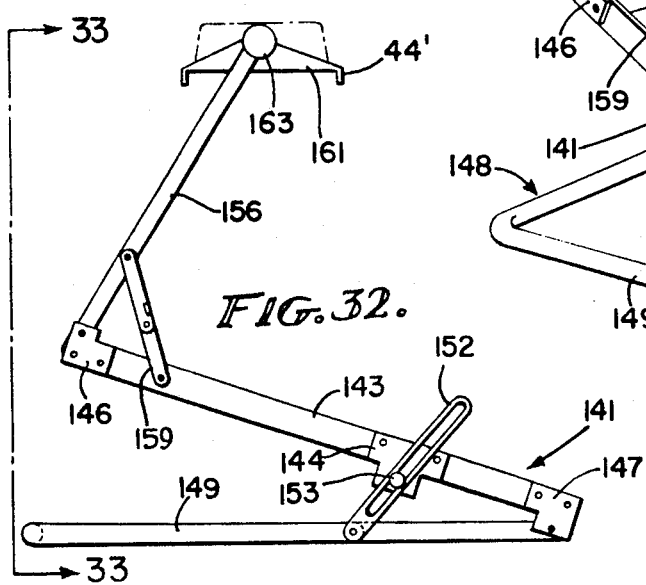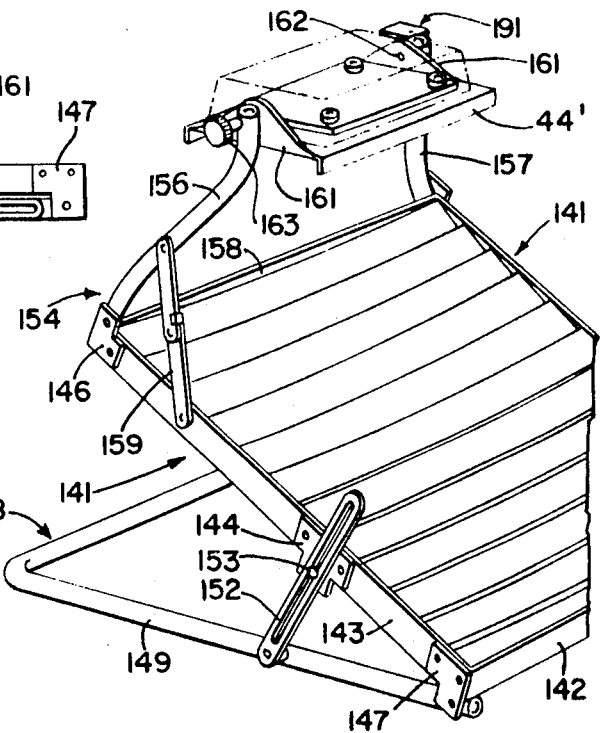

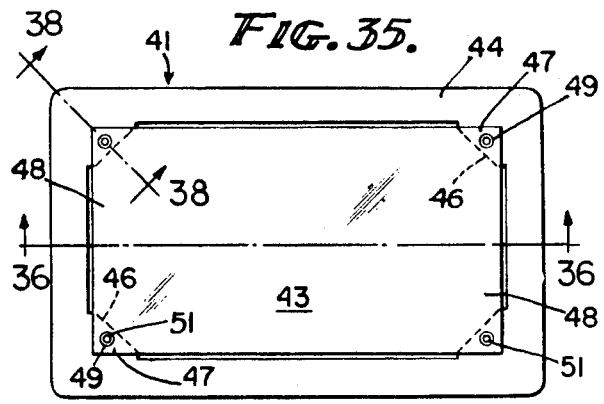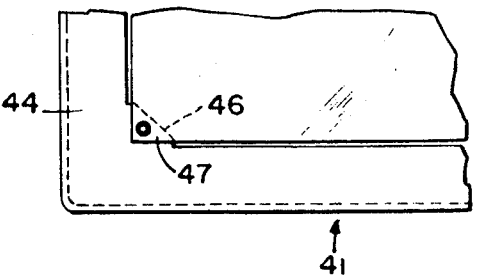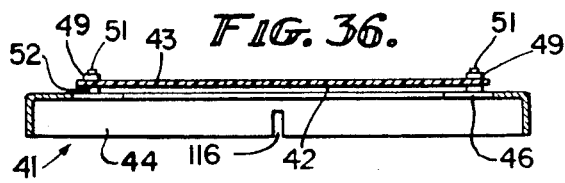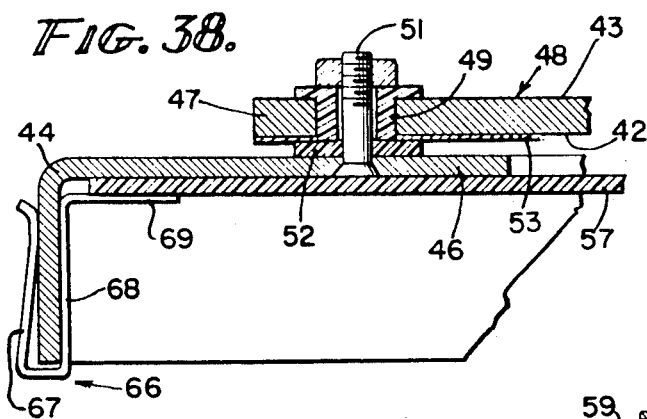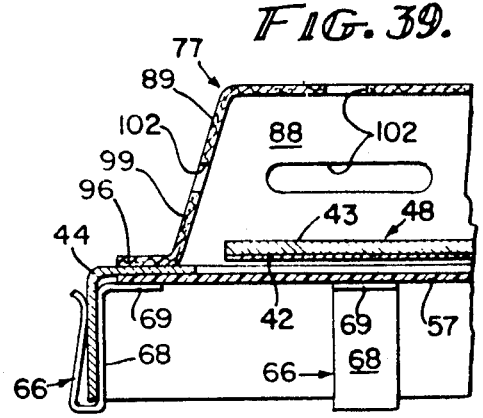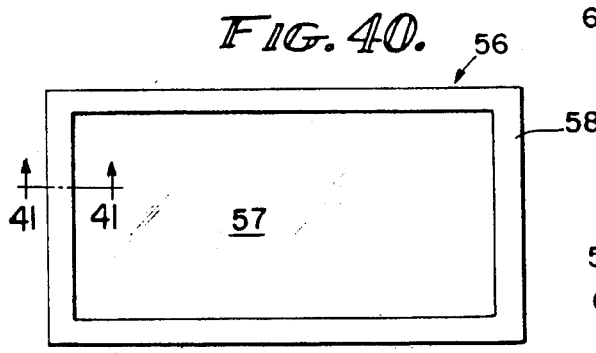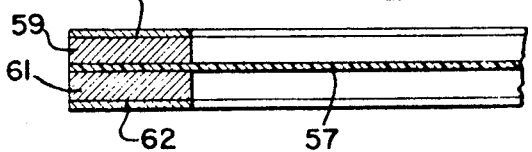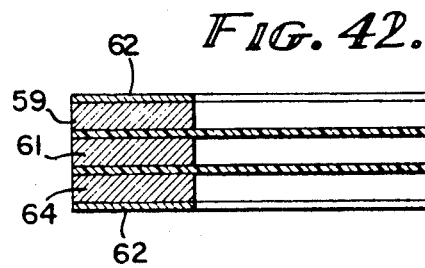

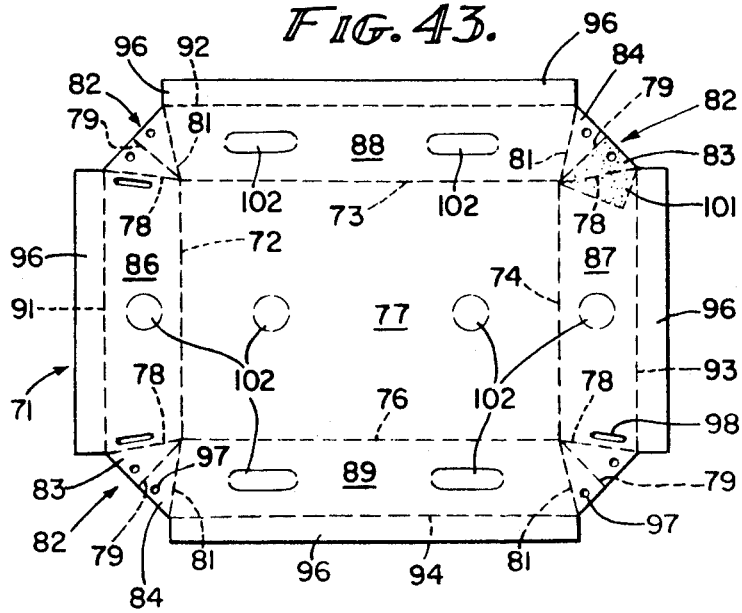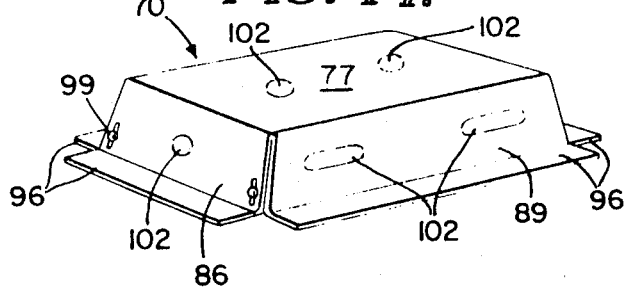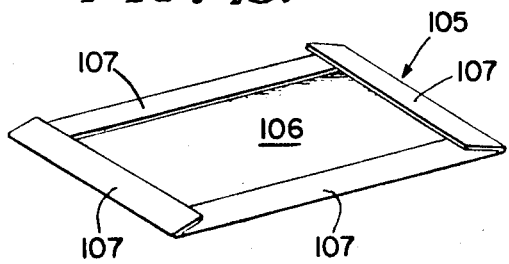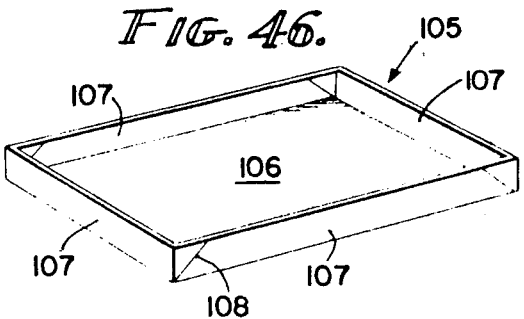

INVENTOR.
ROBERT M. PHILLIPS
BY
John J. Leavitt

INVENTOR.
ROBERT M. PHILLIPS
BY
John J. Leavitt

SOLAR-ENERGY-CONCENTRATING DEVICE

BACKGROUND OF INVENTION

For hundreds of years the sun has been recognized as a source of radiant energy. It is known that such radiant energy extends through the radiant energy spectrum from far infrared through visible light rays to cosmic rays. The sun's radiations falling freely on the earth's surface, on a clear day in the summertime deliver a maximum of about 700 watts per square yard, or 900 watts per square meter. Man has attempted for many years, largely without success, to harness such power for commercial purposes. The prior art is replete with reflector-concentrator devices purportedly capable of intercepting such solar radiation and reflecting it to various types of utilization devices. It is noteworthy that none of such reflector-concentrator devices have succeeded in a commercial sense to convert the sun into a source of energy which may be utilized economically, giving effect to portability and initial cost of the device. Accordingly, it is one of the principal objects of the present invention to provide a reflector-concentrator structure designed to effectively and economically convert radiations from the sun into heat energy utilizable for diverse purposes.

Heretofore, in attempts to utilize radiations from the sun, devices variously known as "solar ranges" or "solar concentrators" or "solar ovens" have been devised to intercept radiant energy from the sun and redirect it onto an absorbing medium. In such devices one of the difficulties that has been encountered is that the absorbing medium has generally been mounted with respect to the reflecting surface so that the absorbing medium lies between the sun and such reflecting surface. The result is that the absorbing medium casts a shadow on the reflecting surface, thus materially reducing its effectiveness, particularly where the concentration ratio is in the order 10 to 1. Accordingly, it is another object of the invention to provide a solar-energy-concentrating device in which the reflector-concentrator panel and the radiant-energy-absorbing surface are mounted so that the shadow cast by the radiant-energy-absorbing surface are mounted so that the shadow cast by the radiant-energy-absorbing surface typically does not fall on the reflecting surfaces of the concentrator panel.

Solar-energy-concentrating devices such as solar ranges taught by the prior art have been unduly complicated and therefore expensive. Such complications have arisen on the one hand by the tendency to provide extremely high concentration ratios of the order of 50 to 1, thus requiring complex geometric and optical configurations, and on the other hand by the opposite extreme of providing a very low concentration ratio, thus necessitating elaborate and expansive insulation techniques to secure retention of sufficient heat energy for practicable utility. This accounts for the reason why solar ranges have not heretofore enjoyed wide acceptance by the public. It is therefore a still further object of the invention to provide a solar-energy-concentrating device in the form of a range which may be manufactured economically and sold in about the $20.00 to $30.00 price group.

A review of the prior art indicates that another reason why solar-energy-concentrating devices have not heretofore enjoyed wide utilization is that such devices are usually bulky, heavy, unwieldy to operate and transport, or short lived. It is therefore still another object of the invention to provide a solar energy concentrator device which is not only economical to manufacture and buy, but which is light in weight, easy to set up and use, easily transported, and constructed for long life and durability in relation to weathering, including rain and wind.

Another reason why solar ranges have not enjoyed acceptance by the public is that conventional solar ranges are limited in their usefulness to relatively few hours in the day, require the use of special and nonexistent cooking utensils, and require frequent manual adjustment to maintain the reflective surface in proper position with respect to radiations from the sun. Accordingly, it is a still further object of the invention to provide a solar range device capable of effective use through the greater part of the day either through manual adjustment of the range, or automatic adjustment through an appropriate tracking device, and which may be used in conjunction with a line of cooking utensils such as hot plates, ovens and cook and fry pans especially designed for use with a solar range.

Obviously, a solar-energy-concentrating device in the form of a range finds special utility in environments such as at beaches and parks and other places of amusement where it is desirable to have a convenient source of heat, yet where regulations preclude the lighting of a fire. Accordingly, it is a still further object of the invention to provide a solar range specially adapted for use in cooking in the out-of-doors, or for providing a source of heat under circumstances where other sources of heat are either unavailable or prohibited.

As indicated above, while the description of the invention is directed primarily toward its usefulness as a source of heat for cooking, it will be apparent that radiant energy from the sun may be used in many different ways to provide a source of heat for diverse purposes. It is therefore a still further object of the invention to provide a reflector-concentrator panel capable of efficiently receiving radiations from the sun and reflecting them to an appropriate radiant-energy-absorbing plate so as to convert such solar radiations into usable heat.

Another object of the invention is the provision of a solar energy concentrator device in which the concentration ratio is approximately 10 to 1.

A still further object is the provision of such a reflector-concentrator fabricated from rigid-foamed plastic such as expandable-bead polystyrene in conjunction with a reflective surface the contour of which is molded and adherent to the concentrator panel.

On some occasions it may be desirable to vary the effective concentration ratio, defined as the ratio of the surface area of the reflector/concentrator to the area of the radiant-energy-absorbing device or surface upon which the reflector-concentrator is focused. So far as is known, prior art or conventional devices have not provided such adjustability. Accordingly, it is a still further object of the invention to provide a solar-energy-concentrating device designed to enable selective adjustment of the energy input to the absorber by selectively varying the concentration of heat flux impinging on the absorber.

For effective operation over long periods, a solar-energy-concentrating device ought to be capable of adjustment to follow the azimuthal and elevational track of the sun. While sophisticated apparatuses have been devised to perform this function in connection with various celestial bodies including the sun, such apparatuses are too complicated and expensive for incorporation into a solar-energy-concentrating device designed to sell in the $20.00 to $30.00 price range. It is therefore a still further object of the invention to provide a solar-energy-concentrating device incorporating effective means for adjustment of the device to accommodate the full azimuthal and elevational positions of the sun.

It is a still further object of the invention to provide a solar-energy-concentrating device designed to function as a basic power unit for converting solar radiations into utilizable heat energy, and a variety of utensils or utilization devices which may be quickly and easily attached and detached from the basic power unit to facilitate practical and convenient use of said heat energy.

The invention possesses other objects and features of advantage, some of which, with the foregoing, will be apparent from the following description and the drawings. It is to be understood however that the invention is not limited to the embodiment illustrated and described, as it may be embodied in various forms within the scope of the appended claims.

BRIEF SUMMARY OF DISCLOSURE

In terms of broad inclusion, the solar-energy-concentrating device of the invention, for convenience described and illustrated as the basic power unit of a solar range, comprises a reflector-concentrator panel adapted to intercept radiant energy from the sun and reflect it in appropriate ratio of concentration upon a radiant-energy-absorbing device or surface. The latter is suspended in relation to the concentrator panel so that the shadow cast by the radiant-energy-absorbing surface typically does not fall upon the reflective surface of the concentrator panel. To accomplish this end, a support frame is interposed between the concentrator panel and the radiant-energy-absorbing surface which permits adjustment of the concentrator panel in relation to the radiant-energy-absorbing surface so that substantially all the convergent solar radiations reflected from the concentrator panel impinge upon it. Means are provided in conjunction with the support frame and concentrator panel to render the structure collapsible to facilitate transportability of the device. Additionally, in one embodiment of the invention, means are also incorporated between the support frame and concentrator panel to automatically and continually reposition the concentrator panel in relation to the sun so that maximum efficiency is achieved through the period of use of the device. In one embodiment of the invention, the concentrator panel constitutes a monolithic slab one surface of which is formed to provide incremental reflective surfaces angularly disposed one to the other and to the sun's radiations so as to provide the optimum degree of convergence of such radiations upon the radiant-energy-absorbing device.

In another aspect of the invention, a plurality of such concentrator panels are mounted in juxtaposed relationship with their adjacent edges supported in a manner to permit adjustment of each of the panels in relation to each other and in relation to the radiant-energy-absorbing device and sun so that radiations from the sun incident thereon are reflected to the radiant-energy-absorbing device. The panels thus arranged provide at least a double convergence or superimposition of radiations from at least two separate sources upon a single radiant-energy-absorbing device.

In still another aspect of the invention, the concentrator panel is a monolithic unit and the reflective surface thereof is formed of a multiplicity of incremental reflective sections each of which is arcuate and extends from side-to-side (Y dimension) of the panel, the incremental reflective sections collectively being distributed over the length (X dimension) of the panel to provide the requisite convergence.

While the solar-energy-concentrating device may be utilized as a basic power unit or source of heat for use for whatever purpose desirable, to facilitate explanation it has been described as embodied to provide the basic power unit or heat source for a solar range. Thusly embodied, it is convenient to consider the radiant-energy-absorbing device as one of several utensils suitable for cooking which may quickly and easily be attached to the basic power unit. In this respect, the radiant-energy-absorbing device may constitute a flat plate upon which radiant energy is convergent to effect heating of the plate to a temperature suitable for cooking whatever substance is placed thereon.

Cooking may frequently take the form of baking. The hot plate or radiant-energy-absorbing device may therefor be provided with an enclosure defining an enclosed volume within which food may be baked, and in which the hot plate forms the primary heating element. Viewed in this aspect, the radiant-energy-absorbing device may constitute a flat metallic plate suspended on a support frame in position to receive the convergent radiant energy reflected upon it by the concentrator panel. Means are provided in conjunction with the hot plate to thermally insulate the hot plate against loss of heat through conduction and convection. When used for baking, such insulation means may include a thermally insulated enclosure effective to provide an enclosed volume within which baking may be effected.

DESCRIPTION OF DRAWINGS

FIG. 1 is a schematic view illustrating in side elevation the preferred relationship between a radiant-energy-absorbing device, the reflector-concentrator panel, the angle of incidence of the sun's rays in relation to the plane of the reflector-concentrator, the angle of reflection of such rays, and the position of the shadow cast by the radiant-energy-absorbing device with respect to the reflective surface of the reflector-concentrator panel to secure about a 10 to 1 concentration ratio and temperatures at the absorbing device ranging selectively from 350° F. to 500° F.

FIG. 2 is a schematic end view of the combination shown in FIG. 1, and illustrating the relationship between a radiant-energy-absorbing device and reflector-concentrator panel arranged to provide one dimensional convergence; i.e., convergence only in the X dimension.

FIG. 3 is a schematic end view illustrating an embodiment utilizing a pair of reflector-concentrator panels arranged to provide two-dimensional convergence; i.e., in both the X and Y dimensions.

FIG. 4 is a schematic end view illustrating an embodiment utilizing three juxtaposed reflector-concentrator panels arranged to provide two-dimensional convergence.

FIG. 5 is a schematic end view illustrating an embodiment in which the reflective surface of the concentrator panel is formed by a multiplicity of incremental reflective sections arcuate in the Y dimension and arranged side-by-side in the X dimension to provide two-dimensional convergence.

FIG. 6 is a perspective view of one embodiment of a reflector-concentrator panel adapted to provide one-dimensional convergence and shown apart from other structure.

FIG. 7 is a vertical cross-sectional view taken in the plane indicated by the line 7—7 in FIG. 6.

FIG. 8 is an enlarged fragmentary vertical sectional view taken in the plane indicated by the line 8—8 in FIG. 6 and illustrating the preferred relationship between reflective surface and rigid substrate.

FIG. 9 is an enlarged fragmentary view illustrating a different embodiment of the reflector-concentrator panel in which individual reflective strips are mounted on a rigid substrate. FIG. 10 is a perspective view of a preferred embodiment of a reflector-concentrator panel adapted to provide two-dimensional convergence and shown apart from other structure.

FIG. 13 is a perspective view of one embodiment of the solar-energy-concentrating device in conjunction with a radiant-energy-absorbing device in the form of a single plate adapted to absorb two-dimensional convergence of radiant energy.

FIG. 14 is a front view of the solar range illustrated in FIG. 13.

FIG. 15 is a plan view of the solar range illustrated in FIG. 13.

FIG. 26 is a perspective view of another embodiment of the solar-energy-concentrating device which utilizes a single reflector-concentrator panel of the type illustrated in FIG. 10, to provide two-dimensional convergence of radiant energy on a single radiant-energy-absorbing device.

FIG. 27 is a side elevational view of the device shown in FIG. 26, equipped with the collapsible pedestal support of FIG. 19.

FIG. 28 is a rear elevational view of the device shown in FIG. 27, in the direction indicated by the arrow 2B.

FIG. 29 is a side elevational view of the device of FIG. 27, shown in collapsed condition.

FIG. 30 is an end elevational view similar to FIG. 28, but expanded to include a pair of juxtaposed radiant-energy-absorbing devices operatively related to a pair of concentrator panels, each panel being adjustable to focus on either absorbing device.

FIG. 31 is a perspective view of a radiant-energy-concentrating device embodying a modified support frame.

FIG. 32 is a side elevational view of the device of FIG. 31.

FIG. 33 is a rear elevational view of the device of FIG. 31.

FIG. 34 is a side elevational view of the device of FIG. 31, shown in collapsed form.

FIG. 35 is a plan view of one embodiment of a radiant-energy-absorbing device shown mounted on a support frame.

FIG. 36 is a vertical cross-sectional view of the radiant-energy-absorbing device of FIG. 35 taken in the plane indicated by the line 36—36 in FIG. 35.

FIG. 37 is a fragmentary plan view in enlarged scale showing the manner of the radiant energy absorbing plate by its associated support frame.

FIG. 38 is a fragmentary sectional view on an enlarged scale taken in the plane indicated by the line 38—38 in FIG. 35, and including a synthetic resinous transparent sheet disposed adjacent the plate for thermal insulation purposes.

FIG. 39 is a fragmentary sectional view taken through the radiant-energy-absorbing device of FIG. 35 when equipped with an enclosure to form an oven chamber.

FIG. 40 is a plan view of a thermal-insulating transparent window construction to be used in conjunction with the radiant-energy-absorbing device.

FIG. 41 is a fragmentary cross-sectional view on an enlarged scale of one form of the window illustrated in FIG. 40.

FIG. 42 is a fragmentary cross-sectional view on an enlarged scale of another form of the window illustrated in FIG. 40.

FIG. 43 is a plan view of a disposable oven-forming enclosure blank in flat extended condition prior to folding.

FIG. 44 is a perspective view of the disposable oven-forming enclosure after it has been folded to form an oven enclosure.

FIG. 45 is a perspective view of a disposable and collapsible cooking utensil blank in oven-folded condition prior to extension for use with the solar range.

FIG. 46 is a perspective view of the disposable and collapsible cooking utensil in unfolded or extended position of use.

DESCRIPTION OF PREFERRED EMBODIMENT

Figure 11:
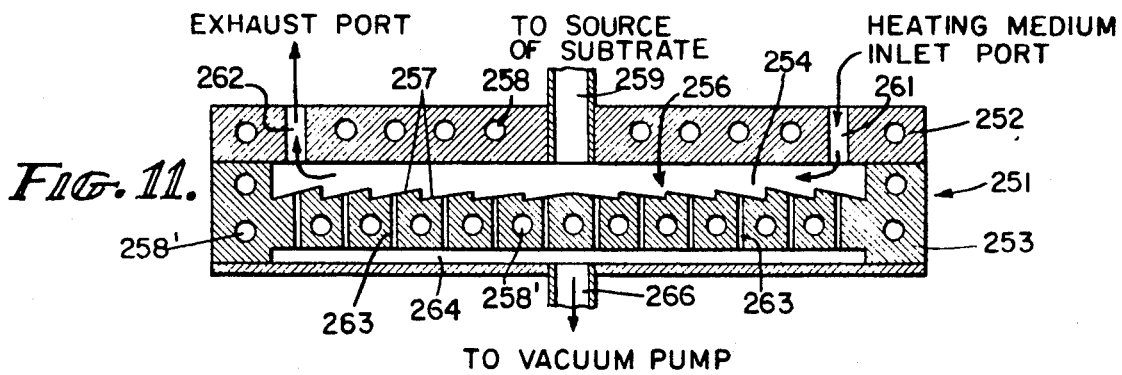
FIG. 11 is a view illustrating schematically means by which the reflector-concentrator panel may be fabricated.

In the design of a solar-energy-concentrating device, as in the design of any system which is to perform a given function, it is necessary to consider the end result sought, the environment in which this result is to be achieved, and the functional and mechanical relationships of the variables. Thus, in the design of a solar range, an analysis must first be made of the "inputs" required in terms of temperature and heat to accomplish the desired types of cooking. The characteristics of the sun as the source of heat to be used to meet the requirements must also be considered. The solar range is then designed with a view toward matching the source of heat to the requirements for different types of cooking over a wide range of outdoor environments. To provide a better understanding of the problems, basic parameters are discussed briefly hereinafter.

In general, two major conditions must be satisfied to produce desirable results in cooking with a solar range:

1. A sufficiently high temperature must be achieved; and
2. A sufficiently high energy input in the form of heat flux must be provided.

With respect to these major conditions, food preparation can be divided into two classes; namely, one which requires high temperature, and another which requires heat energy input as distinguished from temperature. For example, frying requires a relatively high temperature (about 400° F.) but requires little energy input once the desired temperature has been reached. For instance, when bacon, eggs, pancakes or hamburgers are fried on a heavy metal plate brought to a temperature of 400° F. prior to commencement of frying, the heat energy stored in the plate is sufficient to do much of the frying with a relatively small amount of added heat energy.

The low-energy requirement to effect frying results from the small amount of water present. Heating of water to a predetermined temperature requires a relatively greater heat energy input than frying.

To bring water to a boil, the temperature at which the heat is delivered is of secondary importance. The maximum temperature which can be achieved by the water is 100° C. (212° F.), which is about half of the 400° F. at which most frying is done. Assuming no losses, to increase the temperature of 1 pound of water 1 ° F. requires 0.293 watt hours of heat input. Thus, if a solar range operates at the 500 watt level, the time required to increase the temperature of a quart of water (approximately 2.2 pounds) from 62° F. to boiling temperature (an increase of 150° F.) will be approximately 12 minutes. From this it can be seen that it is the total energy input which is important in the boiling of water. If the useful power delivered to the range is doubled, the time required to raise the temperature of the water to a given point is cut in half.

The preparation of some food requires characteristics between those applicable for frying and boiling. For instance, the roasting of large pieces of meat which have a high water content, the preparation of some casseroles and stews and the baking of cakes which require evaporation of water, all require sufficient energy input to achieve the required cooking temperature, and then only enough additional energy input in point of time to maintain that temperature. The higher the ambient temperature (the temperature at which heat is supplied) the less cooking time required.

Going now to consideration of the sun as a source of heat, in comparing the sun (as a source of heat energy) to a range with a gas flame, charcoal, or calrod unit, the sun can be thought of as analogous to a high-voltage, low-current power supply, while the other sources enumerated are equivalent to low-voltage, high-current power supplies. In this analogy, voltage is compared to temperature, and current is compared to the heat flux provided. By using a sufficiently high-concentration ratio, it is possible to achieve extremely high temperatures from the sun. For instance, a solar furnace with a 10 foot diameter concentrator has been used to achieve a temperature in excess of 3,500° C., but the actual power delivered was only about 55 Electric furnaces operating at much higher powers are limited to half that temperature.

The upper limit on the temperature which can be achieved in a solar range is the temperature of the surface of the sun itself. By contrast, the heat flux delivered by radiations from the sun is relatively small. The power delivered to a black body, perpendicular to the rays of the sun, on a clear day in the summertime, is approximately 700 watts per square yard maximum or about 900 watts per square meter. The useful power delivered to an absorber from a concentrating reflector which is 3 feet × 3 feet. (1 square yard) is approximately 500 watts.

In the design of the radiant-energy-concentrating device illustrated and described herein, a maximum concentrator area of 9 square feet was used as a standard, and hence a maximum power input of about 500 watts is provided at the absorber. The 500 watt upper limit on the available power is not as restrictive as it might sound. This is approximately equal to the average power consumed by a 1 kilowatt electric skillet in performing a typical cooking chore.

Two schools of thought, each occupying an extreme position, have heretofore dominated the field of solar range design. At one extreme are those who advocate high-concentration ratios which produce high temperatures without insulation. Advocates have worked with concentration ratios up to 50–1. At the other extreme are advocates of the second school who place emphasis on insulation to prevent heat dissipation at the oven with only a modest concentration ratio. Stoves with concentration ratios as low as 2 to 1 have been built with up to 4 inches of insulation in the oven itself and two to three glass plates to serve as windows operating on the "greenhouse" effect. In both cases the operating temperatures achieved are on the order of only 350°–400° F. Those advocating high-concentration ratios urge that although the low-concentration devices can achieve the temperature, they have an inordinately long recovery time.

The low-concentration ratio advocates counter that a 50 to 1 concentration ratio requires a geometrically complex concentrator with extremely good optics. They also urge that the high-concentration ratio requires the use of either inordinately large concentrators of greater cost, less portability and greater susceptibility to wind damage, or a much smaller load at the absorber. In the latter case, a range capable or preparing only a small amount of food at a time is thus limited in its practicability. The high-concentration ratio advocates counter the cost argument by pointing out that an oven with three glass cover plates and 4 inches of insulation is indeed an expensive item to produce.

The philosophy which guided the design of the radiant energy concentrator device described and illustrated herein was predicated on the belief that from the standpoint of practicability in use and cost, 9 square feet (3 feet × 3 feet) represented an upper limit on concentrator area, and that the area available for food preparation must be comparable to that provided by a modern electric skillet. The ratio of these two areas was calculated to be about 10 to 1. It has been determined in practice that concentration ratios in the range from 6½ to 12 to 1 are satisfactory, with 10 to 1 being preferred, so that only a small amount of insulation is required in the region of the cooking utensil. Additionally, the 10 to 1 concentration ratio is sufficiently low to make possible the development of a reflector-concentrator panel optical geometry far simpler than the parabola of revolution used with all high-concentration ratio devices.

It should be of assistance in understanding the mode of operation of a solar range to consider the relationships between temperature, concentration ratios and insulation. Experimentally, the relationship between unloaded hot plate temperature and the area convergence or concentration ratio is given by the equation $T = KC^{1/2}$, where K is a constant, T is degrees Centigrade, and C is the concentration ratio, defined as the ratio of concentrator area to hot plate area.

The constant K depends upon insulation characteristics, brightness of the sun, to some extent time of day in terms of the sun angle with the horizon, wind loading and outside temperature. For a given day and insulation, the relationship expressed in equation form is accurate over the range of concentration ratios from unity to 12. The maximum value for K has been found to be 81, measured at midday, in clear air and no wind, using relatively thin cardboard insulation. This same maximum was found for several values of C. A typical value for the constant K, achieved with 20 minutes warmup time, was found to be 72. This value for K is used in defining the rated value of unloaded hot plate temperature. Table I shows required concentration ratios and concentrator area for a 9 inch × 13 inch hot plate, for K=72 and rated hot plate temperatures of 350° F., 400° F., 450° F. and 500° F.

TABLE I

| Rated Hot Plate Temperature °F | Concentration Ratio C | Concentrator Area—Ft. |
|---|---|---|
| 350 | 6.0 | 4.9 |
| 400 | 8.1 | 6.6 |
| 450 | 10.4 | 8.4 |
| 500 | 13.0 | 10.5 |

The mechanism by which the hot plate reaches a limiting temperature is the following: The unloaded absorber will reach that temperature at which the heat losses exactly equal the heat input. The major sources of heat loss are: reradiation from the hot plate; convection; and conduction. These heat losses also occur in combination, such as conduction and convection heating of the oven enclosure by the heated air in the oven, with resultant heat loss from the oven enclosure in the form of radiation and convection cooling. The beneficial effect of insulation on hot plate temperature is most marked under adverse operating conditions such as those encountered on a windy day. Table II shows the effect of insulation in terms of the equivalent concentrator area which would have to be added to achieve the same temperature with a hot plate devoid of insulation.

TABLE II

| Insulation | Concentrator area required to produce same temperature uninsulated (normalized to no insulation case) |
|---|---|
| None | 1.0 |
| One transparent window | 1.20 |
| Double transparent window | 1.26 |
| Oven Enclosure | 1.70 |
| Oven Enclosure plus one window | 3.13 |
| Oven Enclosure plus double window | 3.25 |

Going now to consideration of the specific structural and functionally related solar-energy-concentrating devices illustrated in the drawings, and referring specifically to the schematic illustrations FIGS. 1 through 5, intended to show the spatial relationships rather than detailed structure, the invention is embodied in a reflector-concentrator panel designated generally by the numeral 2, suitably supported on a frame (FIGS. 13, 26 and 31) to be hereinafter described in greater detail. Supported above one end of the concentrator panel by the frame is a radiant energy absorbing device designated generally by the numeral 4. The concentrator panel 2 is formed from a monolithic slab 6 of rigid foamed plastic such as expandable-bead polystyrene one surface of which is provided with a multiplicity of incremental reflecting sections 7. Each of the reflecting sections is angularly disposed with respect to adjacent reflecting sections so that solar radiations illustrated in FIG. 1 as incident rays 8, impinge upon the reflective sections and are reflected in toward the absorber as reflected rays 9 illustrated in FIG. 1 as dash lines.

The angular dispositions of the reflective sections 7 in the X dimension over the length of the concentrator panel vary so that the optimum efficiency obtains when the angle of the sun's rays with respect to the panel approximates 68°. Satisfactory results have been achieved in devices in which this angle varied from 60° to 75°, and the height of the absorber above the panel varied from 21 to 26 inches. When these conditions obtain, all of the reflected rays from all of the incremental reflective sections are convergent upon an area of the underside of the radiant-energy-absorbing device 4 having a width slightly more than the width of one of reflective sections, and positioned above and adjacent one end of the concentrator panel. With the concentrator panel and absorber 4 thus related to each other and to the sun, the shadow 12 cast by the radiant-energy-absorbing device typically does not fall upon any portion of the reflective surface of concentrator panel 2. In FIG. 1, the shadow cast by the radiant-energy-absorbing device is indicated by the shaded area in the figure.

Tests have shown that a concentrator panel thus formed, in association with a radiant-energy-absorbing device positioned as indicated, is capable of producing an optimum concentration ratio of about 10 to 1, with the temperature of the radiant-energy-absorbing device being raised to the order of 350° to 500° Fahrenheit.

From FIG. 2, it will be noted that for maximum efficiency in an embodiment designed for one-dimensional convergence, the length of the radiant-energy-absorbing device (Y dimension) should preferably equal the width (Y dimension) of the concentrator panel. In this manner, reflected rays converge toward and impinge over substantially the entire length of the radiant-energy-absorbing device or "hot plate" from the entire reflective surface of the concentrator panel, as indicated by the dash lines. In this embodiment, all convergence is in the direction of the X dimension, and there is no convergence in the direction of the Y dimension. Stated in other words, to secure optimum one-dimension convergence, the angle between the sun's rays and the longitudinal axis extending in the X dimension is preferably maintained at 68°. The angle between the sun's rays and a transverse axis extending in the Y dimension is 90° to achieve optimum focusing of the reflected rays on the absorber.

In FIG. 3, two concentrator panels 2 and 2' of similar configuration are arranged in tilted juxtaposition along their X dimensions so that the reflected rays from each panel impinge and overlap upon the entire absorbing surface of the absorber 4. This tilted relationship produced a 2 to 1 optical convergence in the Y dimension, and will hereinafter be referred to as two-dimensional convergence.

FIG. 4 illustrates schematically an arrangement of three concentrator panels 2, 2' and 2'', in which each of the panels, considered individually, is related to the absorber in a manner to provide one-dimension convergence, but which, when considered collectively, produce 3 to 1 convergence in the Y dimension. The effective increase in heat flux imposed on the absorber is illustrated graphically by the shading applied in the overlapping heat zones defined by the reflected rays 9.

FIG. 5 illustrates an optimized configuration in which a single slab 6 is provided with a reflective surface 7' or incremental reflective sections 7 arranged in side-by-side relation in the X dimension, and which curve in the arc of a circle in the Y dimension to produce two-dimensional convergence of any selected ratio from less than 2 to 1 to more than 3 to 1. It has been found that for a 2 to 1 Y convergence, assuming a Y dimension of 24 inches and a focal length (distance between concentrator and absorber) of 25 inches, the distance between the arc defined by the reflective surface and the chord 10 subtended by the arc amounts to only about three-fourths of an inch. Experience has taught that an optimum concentration ratio of 10 to 1 may be obtained with a two-dimensional convergence concentrator panel designed to provide 4 to 1 convergence in the X dimension, and 2 ½ to 1 convergence in the Y dimension, the total concentration ratio being the product of the X and Y convergence ratios. In terms of actual dimensions, a concentrator panel 36 inches in the X dimension and 32½ inches in the Y dimension would utilize a "hot plate" or absorber 9 inches in the X dimension by 13 inches in the Y dimension for optimum concentration.

It has been found that satisfactory one-dimension convergence may be obtained from the incremental reflective sections 7 when such reflective sections constitute flat surfaces in both the X and Y dimensions and which are arranged in two groups, one on either side of a median plane. With the reflective sections so arranged in two groups, the depth of the panel is reduced to a practical thickness, enabling disposition of the panel as a whole so as to provide an angle ranging between 60° and 75° between the sun's rays and the X axis. The reflective sections 7 are disposed one with the other so as to provide the requisite convergence of the reflected rays upon the absorber during most of the solar day from a flat reflector-concentrator panel.

It is feasible to form the stepped reflective sections in the slab of rigid expandable-bead foam through either a cutting process utilizing a hot wire and a preformed template or, preferably, a molding process which will hereinafter be explained in greater detail. In either case, the stepped surface of the concentrator panel substrate is provided with a reflective surface which may constitute individually formed reflective strips 12 applied to each of the steps and secured thereto by an appropriate adhesive layer 13 (FIG. 9), or which may be in the form of a continuous base sheet 14 (FIG. 8) of a suitable synthetic material such as "Mylar" or "Tedlar" to which is adherent a reflective layer 16 of aluminum or other reflective material. The entire panel is draped and the sheet 14–16 caused to conform to the configuration of the stepped surface across the entire extent of the panel. Conformation of the reflective layer with the steps of the panel may conveniently be effected by draping the reflective film or sheet in the mold prior to molding of the slab so that upon completion of the molding process the sheet of reflective material is adherent to the stepped face of the concentrator panel.

It has been found that many different materials may be used to provide a reflecting surface. For instance, highly polished anodized aluminum in both plate and foil form have been utilized successfully. In other instances, vacuum aluminized plastic film has also been used successfully. In FIGS. 6 and 8, the incremental reflective sections or surfaces 7 are illustrated as formed from a continuous composite sheet 14–16 draped over the stepped surface of the concentrator panel and caused to adhere thereto so as to conform to the special configuration of the reflective sections.

The concentrator panel thus formed, as shown in FIG. 6, is provided with a peripheral frame 17, preferably of aluminum. The frame may incorporate a bottom panel (not shown) to form a shallow pan within which the substrate may be seated, and such a construction is useful in that it protects the underever is that use of such a panel increases the weight of the assembly. It has been found that the substrate is sufficiently rigid to be self-supporting.

Referring now to the embodiment of the invention illustrated in FIGS. 13 through 18, the solar range there shown and designated generally by the numeral 21 comprises a pair of concentrator panels 22 and 23 (FIG. 13). At one end, the frames 17 supporting the juxtaposed concentrator panels are pivotally interconnected adjacent their associated long edges on a bracket 24 riveted to auxiliary brace member 26. The upper end of the brace is pivotally secured to a gusset 27 disposed between the upper end of the auxiliary brace and the upper end of a central support post 28, which may be in the form of a hollow pipe. The lower end portion 29 of the post is adapted to be selectively supported upon a suitable stand such as those illustrated in FIGS. 19 through 21, inclusive, and which will be described in greater detail hereinafter.

To support the forward ends of the frames 17 within which the concentrator panels are seated, the forward ends of the frames are pivotally connected by a support bracket 31 as shown. The pivotal interconnection of the concentrator panel frames permits the panels to be pivoted upwardly into the relationship shown in FIG. 18 to facilitate storage when the device is not is use.

To extend the usefulness of the solar range, it is desirable that means be provided to adjust the solar range for maximum efficiency at any time of the day. Such efficiency is obtained by altering the positions of the concentrator panels either intermittently or continually to compensate for the apparent movement of the sun in elevation and in azimuth.

To facilitate manual adjustment of the device, referring to FIGS. 13 through 18, a slotted friction link 36 is pivotally connected at one end to the brace 26 and slidably engages a lug 37 projecting from post 28. The lug may constitute the threaded shank of a thumb screw (not shown) equipped with suitable friction-type washers to frictionally engage the link and retain it in adjusted position. Adjustment of the panels to compensate for elevation of the sun is accomplished by pivoting the brace 26 toward or away from the support post 28, thus causing the connector panels to shift along the X axis in relation to the support post.

Adjustment of the panels to compensate for apparent azimuthal movement of the sun is effected by merely rotating the support post in the proper direction to track the sun.

When the concentrator panels are in optimum position in relation to the sun, the sun's rays will be focused on a radiant-energy-absorbing device designated generally by the numeral 41, and supported on the upper end of the support post 28 so that in all positions of the concentrator panels, the lower surface 42 of the radiant-energy-absorbing device is in position to receive the reflected rays from the concentrator panels. Additionally, inasmuch as the radiant-energy-absorbing device is intended to be used for cooking, it is important that the upper surface 43 be maintained horizontal so as to avoid spilling whatever might be supported thereon.

Referring to FIGS. 35 through 39, the radiant-energy-absorbing device per se, when embodied for cooking, includes a generally rectangular frame 44, conveniently of inverted L-shaped cross section.

At each corner of the frame thus formed, an inwardly extending integral section of the frame provides a tab 46 to which the superposed corners 47 of flat plate 48 are attached. The plate constitutes the heat-absorbing element of the range and is conveniently a ⅛-inch aluminum plate isolated from the supporting frame by thermally insulating grommets 49. Each grommet extends through an aperture in the corner of the plate and thermally insulates the attaching bolt 51 from the plate. Additional thermal insulation is provided by a washer 52.

To constitute an efficient absorber of heat energy, the underside of the plate 48 is preferably provided with a flat black coating 53 upon which the reflected rays may impinge. Such coating is shown in exaggerated thickness in FIG. 38. Ideally, the coating 53 is of such thickness and quality to function as a filter for solar radiations. It has been found that if the coating is about 50 microinches thick it will permit absorption of the wavelengths represented by the sun's radiations, (centered around 0.5 microns) while acting to prevent a reradiation of the wavelengths represented by the radiation temperature of the plate, which wavelengths center around a mean of 5 microns.

While such coatings have been achieved, they are expensive and lack the desired durability in relation to their cost. Alternatively, it has been found that a product sold under the trade name "JET INK" may be utilized at much less cost to increase the absorptivity of the plate.

To raise the plate to the desired temperature, it is advisable to insulate the plate from the ambient atmosphere to prevent loss of heat energy through convection. For this purpose, the underside of the plate is covered by a transparent sheet or window designated generally by the numeral 56. The details of construction of two different types of windows are illustrated in FIGS. 40, 41 and 42, and the method and means of attachment of the window in relation to the radiant-energy-absorbing plate 48 is illustrated in FIGS. 37, 38 and 39.

Referring to FIGS. 40-42, the window 56 is preferably fabricated from transparent polyester film 57 having a thickness of the order of 0.0005 inch to 0.005 inch. Such material may be purchased under the trade name "Mylar." For windows of greater transparency, a fluorocarbon film sold under the trade name "Teflon" may be used. Additionally, it has been found that the polyvinyl fluoride film sold under the trade name "Tedlar" is also satisfactory.

The transparent film is retained in extended position of use by a peripheral frame 58, conveniently fabricated from a material having a low thermal conductivity, such as cardboard or a rigid foamed plastic such as expandable-bead polystyrene, and which provides the requisite stiffness and rigidity. In FIG. 41, the frame is formed by two backing members 59 and 61 adherent to opposite sides of the film.

Inasmuch as the frame of the window will sometimes be exposed to the concentrated heat rays focused on the underside of the plate 48, it is desirable that the surface of the frame be protected with a layer 62 of aluminum or other foil to reflect such heat rays away from the frame and increase its life expectancy.

In the embodiment of the window illustrated in FIG. 42, a second transparent film 63 has been added, adherent to the opposite surface of frame member 61 from film 57, and backed as before by a frame member 64 and a layer 62 of reflective foil.

As shown in FIGS. 38 and 39, the window 56 is removably attached to the frame 44 in close yet spaced association with the undersurface 42 of the radiant-energy-absorbing plate 48. The low-thermal conductivity of the frame members 59, 61 and 64 insulates the film against direct conduction of heat from the frame, which is itself adequately insulated from the plate 48. Resilient clips 66 having U-shaped legs 67 and 68 slip resiliently over the downwardly extending leg of the frame, and each clip is provided with a transversely extending lug 69 which abuts the underside of the window to retain it in position. When properly retained in position, the concentrated rays of the sun focused on the underside of plate 48 pass directly through the transparent window with little impedance. Since the window frame is held snugly against the plate frame 44, a narrow sealed space is provided between the window and the underside of the hot plate 48. Such space aids materially in minimizing the heat losses due to convection.

Maximum efficiency is achieved when the upper surface 43 of the plate 48 is shielded against convection cooling by wind and other ambient conditions. It has been found that such protection is preferably provided by an oven enclosure designated generally by the numeral 70 in FIG. 44. The method of application of the oven enclosure is shown in dash lines in FIGS. 13, 25, 26 and 31.

With respect to the construction of such enclosures, reference is made to FIG. 43, wherein is shown the pattern of a thermally nonconductive sheet or blank 71 formed with appropriate fold or score lines 72, 73, 74 and 76, indicated in dash lines, to facilitate folding of the blank to form the top 77 of the enclosure of FIG. 44. At the intersections of score lines 72–73, 72–76, 73–74 and 74–76, three radially outwardly extending and divergent score lines 78, 79 and 81 are provided. At each intersection the score lines 78 and 81 define a triangular section 82 bisected by the score line 79 into two segments 83 and 84.

The triangular sections 82 are interposed between end and sidewall portions 86–87 and 88–89, respectively. Adjacent their outer extremities, the sidewall and end wall portions are scored by lines 91, 92, 93 and 94, parallel respectively to score lines 72, 73, 74 and 76 and the outer edges of the end and side portions, to define flanges 96 on the enclosure when folded as shown in FIG. 44.

To retain the blank in folded condition, apertures 97 may be provided in segments 83 and 84 as shown in FIG. 43, positioned to register when the blank is folded. Slots 98 formed in each end portion 86 and 87 adjacent score lines 78, register with apertures 97 and admit a suitable brad 99 (FIG. 44) to releasably lock the blank in folded condition. The advantage of such releasable interconnection is that after use the oven enclosure may be flattened to facilitate storage for eventual reuse.

For a permanently formed oven enclosure, both segments 83 and 84 are provided with an appropriate adhesive on one side, as indicated by the stippling on the section 82 in the upper right-hand corner of the blank in FIG. 43. Additionally, the reverse side of segment 84 is provided with adhesive, as in an area 101 on end portion 87 adjacent score line 78 as indicated by the phantom lines that define the area. Thus, when the blank is folded, the adhesive coated segments are brought into contact and retain the enclosure in folded condition.

To relieve the pressure of steam generated within the oven by evaporation of water from food being cooked, punchout blanks 102 are provided in the end, side and top walls of the oven enclosure.

The oven enclosure thus formed may be of two varieties. In one variety, the blank 71 is formed from sheet aluminum, and in folded condition as illustrated in FIG. 44, constitutes a permanent oven enclosure not intended to be disposable. The other variety of oven enclosure may be formed from a relatively thermally nonconductive cardboard or other material with or without a metal foil lining. Such latter construction is particularly advantageous for portable models adapted for carrying to parks and beaches. It will of course be understood that use of the disposable foil-lined cardboard oven enclosure shields the hot plate from the ambient atmosphere and provides many more times of thermal insulation than the wholly aluminum enclosure, thus rendering the solar range substantially unaffected by outside air temperature and wind.

Food to be prepared by frying or grilling need not be enclosed in an oven chamber. However, it should be contained in some manner so that grease or juices rendered during cooking will not spread over the hot plate and drip onto the transparent window. Such fouling of the window reduces the efficiency of the solar range because it obscures the transparent qualities of the window. To prevent such fouling yet realize the full potential of the solar range and the heat generated thereby, there is provided (FIGS. 45 and 46) a collapsible fry pan or cooking utensil designated generally by the numeral 105, and comprising a bottom 106 on the peripheral edges of which are formed a plurality of flanges 107. The sheet or blank from which the utensil is formed is provided with appropriate score or fold lines defining the union between the bottom and each of the flanges.

Appropriate fold lines 108 are provided so that in collapsed form the fry pan may be folded flat as illustrated in FIG. 45. In this folded condition, many such utensils may be packed in a single container for storage or for shipping. When it is desired to use one of the utensils, a folded unit is extracted from the package in which it is contained and unfolded into the configuration illustrated in FIG. 46. Such a utensil may be used either in conjunction with the oven enclosure, or as a separate container to be placed directly on the hot plate. In the latter use, the bottom 106 of the fry pan is preferably fabricated from a relatively heavy gauge aluminum foil having high-thermal conductivity. The sidewalls of such utensil may be fabricated from the same relatively heavy gauge aluminum foil, formed into a flat package by overfolding. The fry pan is readily unfolded by lifting the corners and erecting the sides.

As previously mentioned, it is desirable that the radiant-energy-absorbing device be maintained horizontal so as to avoid spilling contents placed thereon. This purpose may be achieved in three different ways as illustrated in FIGS. 13, 26 and 31.

Referring to FIG. 13, the radiant-energy-absorbing device there shown is designated generally by the numeral 112, and includes the frame and hot plate assembly of FIGS. 35 and 36, together with the window assembly illustrated in FIGS. 40–42, attached to the frame as shown in FIGS. 38 and 39. This entire assembly is detachably and securely supported in proper position in relation to the concentrator panels in the following manner.

Fixed on the upper end of post 28 is a cross rod 113 opposite ends 114 of which are flattened as shown to provide a tenon or key portion of less thickness than the rest of the rod. The flattened ends of the cross rod are adapted to be received in slots 116 formed in the opposite long edges of the frame 44 to which hot plate 48 is attached. With the frame thus locked to the cross rod against movement in any direction except up, the hot plate is supported in position to receive the convergent radiant energy rays reflected by the concentrator panels 22 and 23.

Figure 25:
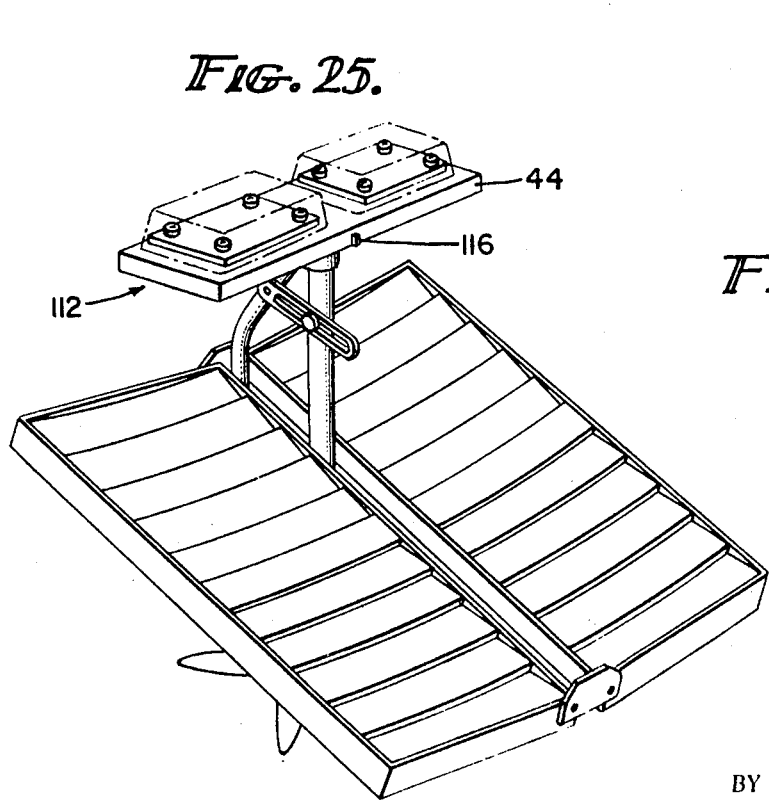
FIG. 25 is a perspective view of a modified version of the embodiment illustrated in FIG. 13, showing the radiant-energy-absorbing device as a pair of plates each adapted to absorb two-dimensional convergence of radiant energy from an associated reflector-concentrator panel of a pair of such panels.

In the instant embodiment (FIG. 13), inasmuch as there are a pair of juxtaposed panels separated by the central post 28 and brace 26, reflected rays from each of the panels are preferably focused upon a separate area of the plate 48 rather than superimposed over the entire area of the plate. At least three advantages flow from this arrangement. The plate 48 may be divided into two side-by-side areas thermally insulated from each other by a space therebetween, with the result that different types of cooking can progress simultaneously on the separate plates. Secondly, a suitable single enclosure may be arranged over both plates (FIG. 13), or separate enclosures may be superimposed over the separate plates (FIG. 25). Thirdly, focusing the solar rays in this manner keeps the central post, cross rod, brace and link 36 out of the heat zone. In this embodiment, all that is required to remove the radiant-energy-absorbing device is to lift it off the cross rod.

Referring to the embodiment of the invention illustrated in FIGS. 26 through 30, this embodiment utilizes a different main support comprising a generally U-shaped frame 121, preferably fabricated from aluminum tubing. The frame includes side arms 122 and 123, connected at their lower ends by a crossmember 124. At the midpoint of the crossmember, a stub shaft 126 is provided, adapted to cooperate with any one of a number of different types of support bases as hereinafter described.

The upper ends of side arms 122 and 123 are pivotally connected as at 127 to the upper free ends of arms 128 and 129 of a second smaller U-shaped frame 131. The bottom crossmember 132 of the frame 131 is pivotally attached across the rear edge 133 of the single concentrator panel 134, which is preferably fabricated in the configuration illustrated by FIG. 5, by appropriate brackets 135.

The radiant-energy-absorbing device 112 is secured to the upper ends of U-shaped frames 121 and 131 in a manner to permit pivotal movement of frame 131 in relation to frame 121 and concentrator panel 134, while maintaining unchanged the positional relationship between frame 121 and the radiant-energy-absorbing device. In this manner, concentrator panel 134 may be altered in its relationship to the sun's rays and the radiant-energy-absorbing device so as to maintain the optimum focusing criterion previously discussed.

As with the embodiment illustrated in FIG. 13, the adjusted position of the concentrator panel is maintained by a slotted friction link 136 pivotally anchored at one end to arm 128 of frame 131 and slidably engaging a stud (not shown) fixed in arm 122 of frame 121, thus forming an adjustable strut therebetween.

To change the inclination of the concentrator panel to compensate for elevation of the sun, the panel is merely pushed or pulled from one end or the other to overcome the frictional holding force imposed by the slotted link. The exertion of sufficient force effects pivotal movement of frame 131 about pivot pin 127. Since there is a pivotal interconnection between frame 131 and the concentrator panel, the inclination of the latter will vary in accord with pivotal movement of the frame.

Adjustment of the concentrator panel to compensate for azimuthal variations in the sun's position is effected simply by rotating the main support frame 121 about the axis of the stub shaft 126.

The versatility of this embodiment is illustrated in FIG. 30, which depicts an adjustable temperature two-surface range in which a pair of concentrator panels are mounted in juxtaposition in a common or separate frames. In a normal attitude each concentrator is focused on its associated hot plate. When it is desired to increase the temperature of one of the plates, the opposite concentrator panel is pivoted upwardly from its outer edge so that rays of solar energy which it reflects are focused on the opposite hot plate. The heat flux imposed upon the one hot plate is therefore doubled, effecting a substantial increase in the temperature of the hot plate.

FIGS. 31 through 34 depict another embodiment of the solar concentrating device in which the primary difference is in the support structure. As shown in FIG. 31, the concentrator panel 141 is preferably of the two-dimensional convergence type illustrated in FIGS. 5, 13, 25, 26 and 30. The panel is supported in rigid frame 142 having longitudinal side members 143, each side member having depending therefrom intermediate its ends a short flange 144.

At opposite ends of each side member there are attached bearing brackets 146 and 147. Pivotally journaled on bracket 147 is a U-shaped main support frame 148 having parallel arms 149 and 151 adapted to lie flat upon a supporting surface such as the ground or a deck. A slotted friction link 152, pivoted at one end to arm 149 and slidably and frictionally engaging a stud 153 fixed on flange 144, provides a wide range of adjustment of the concentrator panel to compensate for variations in the elevation of the sun. Compensation for azimuthal variations of the sun is effected by turning the frame 148 bodily in the appropriate direction.

Journaled on bearing bracket 146 is a second smaller generally U-shaped frame 154 having side arms 156 and 157 joined at their lower ends by a crossmember 158. In position of use, as shown in FIG. 31, the arms 156 and 157 are held in an upright attitude by a toggle link 159.

The radiant-energy-absorbing device 112 in this embodiment includes a modified frame 44' in which opposite end flanges 161 are bent upwardly as shown and pivoted at 162 to the upper ends of arms 156 and 157. This arrangement places the pivot 162 above the center of gravity of the hot plate, thus insuring that the hot plate will normally depend therefrom in a horizontal attitude. To lock the hot plate against such pivotal movement, as when the solar range is properly focused and ready for use, a knurled thumb nut 163 may be provided (FIG. 32), cooperating with friction washers (not shown) to retain the hot plate in adjusted horizontal position. To collapse and store the solar range, all that is required is that thumb nut 163 be loosened and toggle 152 broken so that the frames may assume the positions depicted in FIG. 34.

Figure 19:
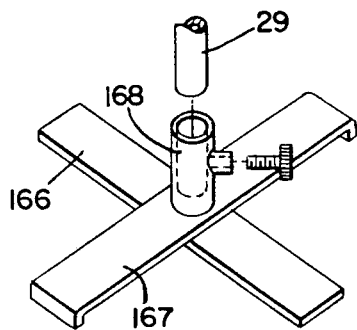
FIG. 19 is a perspective view of the collapsible pedestal support for the solar range of FIG. 13.
Figure 20:
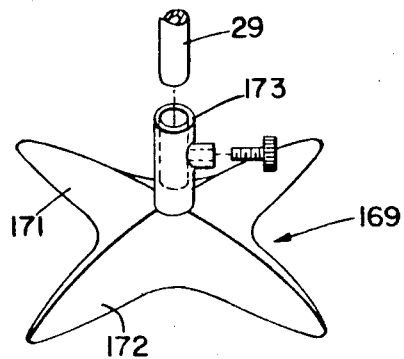
FIG. 20 is a perspective view of a modified rigid and noncollapsible pedestal support for the solar range of FIG. 13 which is capable of substitution for the collapsible support of FIG. 19.

Support for either of the solar range embodiments depicted in FIGS. 13–18 and 26–30 may be provided by any one of the support structures shown in FIGS. 19 through 22, inclusive. The folding pedestal of FIG. 19 provides pivotally connected crosspieces 166 and 167 which may be selectively extended as shown, or folded into overlapping parallel relationship. A centrally disposed tubular socket 168 is provided to slidably receive the cylindrical elements 29 and 126 of FIGS. 18 and 28, respectively. The rigid pedestal 169 of FIG. 20 provides rigid crossarms 171 and 172, and a centrally disposed socket 173 to receive the elements 29 and 126.

Figure 21:
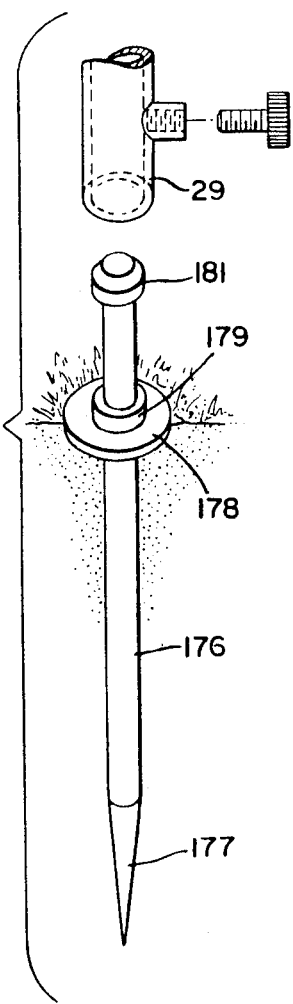
FIG. 21 is a perspective view of a stake support adapted to be driven into the ground to form a support on which the solar range of FIG. 13 may be rotatably supported to accommodate azimuthal variations in the position of the sun.
Figure 22:
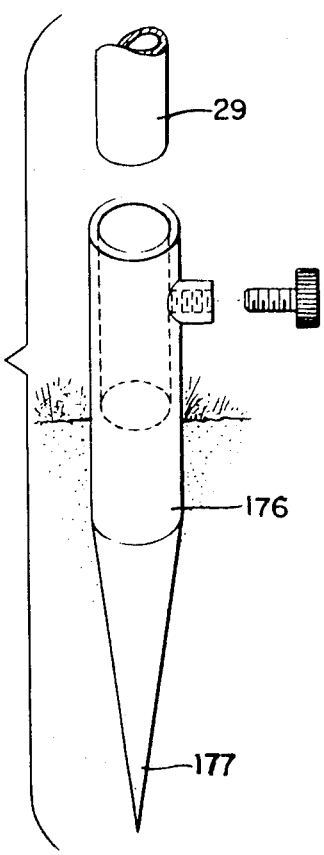
FIG. 22 is a perspective view of a stake support specially adapted to be driven into sand to form a support for the solar range of FIG. 13.

The support structures of FIGS. 21 and 22 are adapted to be driven into the ground or sand, and each comprises an elongated body 176 having a sharp point 177 at one end. The camping stake of FIG. 21 is provided with a flange 178 having a shoulder 179 thereon proportioned to be snugly surrounded by the hollow elements 29 and 126. A head 181 on the end of the body opposite the point and spaced from the flange cooperates with the flange to lend lateral stability to the elements 29 and 126 when slipped over the exposed end of the stake, while permitting rotation of the elements 29 and 126 thereon to accommodate azimuthal adjustment of the concentrator panel. The upper end of the stake of FIG. 22 is formed simply with a socket to rotatably receive the complementary elements 29 and 126.

From the foregoing it will be apparent that highly practical solar-concentrating devices have been designed which, when properly focused, may be used to provide a source of heat for many purposes.

Figure 24:
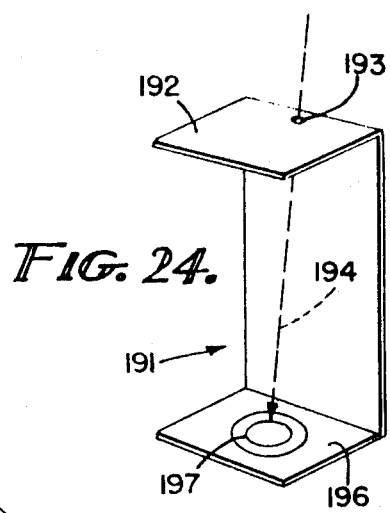
FIG. 24 is a perspective view of an optical focusing cell useful in conjunction with the solar range of FIG. 23 for adjusting the reflector-concentrator panel.

To facilitate proper initial focusing of the concentrator panels and intermittent manual readjustment to compensate for apparent movement of the sun, there is shown in FIG. 24 a focusing cell comprising a generally U-shaped frame 191 in one end 192 of which is provided a pin hole 193 to admit a ray of light 194. The ray of light passing through the pinhole impinges upon the lower end 196 of the frame and creates a spot of light thereon. The lower end of the frame is provided with a suitable target 197 arranged so that when the shaft of light falls on the target the concentrator panels are properly focused. The focusing cell may be permanently attached to the concentrator as shown in the embodiments illustrated in FIGS. 13–18 and 26–29. In the embodiment of FIGS. 31–34, the cell may be attached to the support frame for the radiant-energy-absorbing device as shown.

Focusing of the device is effected by rotation of the entire frame to adjust for azimuthal changes in the sun's position, and an adjustment in the angle of inclination of the concentrator panel with respect to the support frame to compensate for variations in elevation of the sun. When such adjustments result in the spot of light aligning itself with the target 197, the solar range is adjusted for maximum efficiency.

Figure 23:
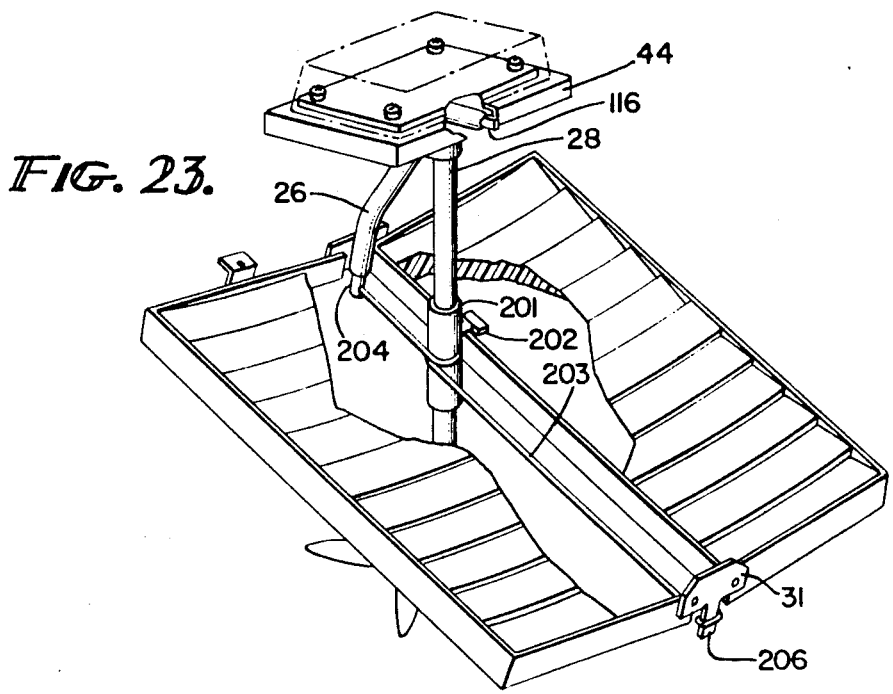
FIG. 23 is a perspective view of the solar range of FIG. 13 modified to incorporate means for varying the position of the reflector-concentrator frame to compensate for elevational variations of the sun.

Refocusing in the embodiments illustrated in FIGS. 13, 23 and 25 is accomplished through a slight rotation of the main support frame with respect to the base to compensate for azimuthal variations of the sun, and by an increase or decrease of the inclination of the concentrator panel or panels to adjust for variations in elevation of the sun. Two mechanical configurations have been devised and are illustrated in FIGS. 23 and 47, to effect and hold any desired positioning of the concentrator panel relative to the central support post 28 without dependence on the friction link 36, which is omitted when these two mechanical configurations are used.

Referring to FIG. 23, there is shown a manually operated elevation system utilizing a friction sleeve 201 selectively rotatable in relation to post 28. If desired, a thumb screw or wing nut 202 may be provided to lock the sleeve against rotation. Coiled about the sleeve is a line 203. One end of the line is anchored to the lower end 204 of the auxiliary brace 26, while the other end of the line is anchored to a depending flange 206 integral with end bracket 31. To adjust the inclination of the concentrator panel, the sleeve 201 is rotated in the desired direction. Rotation of the sleeve in a clockwise direction, as viewed in FIG. 23, will effect an increase in the inclination of the panel, while rotation in the opposite direction will decrease the degree of inclination.

In some instances it is desirable that adjustment of the concentrator panel with respect to the azimuthal and elevational changes of the sun be effected automatically. Means are provided, as illustrated in FIGS. 47 through 54, to automatically track the sun, thus relieving the user of the solar range of the necessity of refocusing the range at 20- to 30-minute intervals to secure maximum efficiency, and making possible unattended operation after initial focusing of the range.

Figure 47:
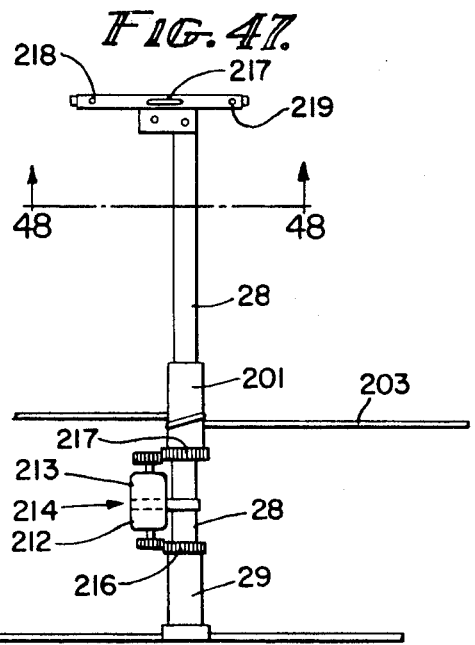
FIG. 47 is an elevation of a modified version of the support frame of FIG. 23 with the radiant-energy-absorbing device and reflector-concentrator panel removed to facilitate illustration of a mechanism effective to secure automatic tracking of the sun by the concentrator panel.

The tracking system drive illustrated in FIG. 47 utilizes two small battery-operated motors 212 and 213 automatically and appropriately energized by sensing cells to compensate for azimuthal and elevational defocusing. Both motors are contained in a common housing 214 attached to the main central support shaft 28. Motor 212 is coupled to gear 216 fixed on the base member 29, while motor 213 is coupled through gear 217 to sleeve 201 concentrically and rotatably disposed about post 28. Wrapped about sleeve 201, as in FIG. 23, is line 203 which has opposite ends anchored to the concentrator panel in the manner discussed in connection with FIG. 23. When motor 213 is energized, the sleeve 201 is rotated relative to the base and post 28, thus effecting elevational adjustment of the concentrator panel.

Figure 48:
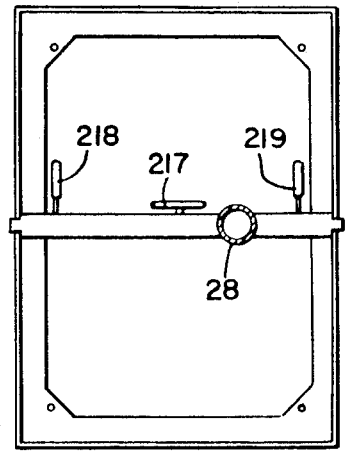
FIG. 48 is a bottom view illustrating the hot plate frame and the positioning of sensing cells thereon for cooperation with the tracking mechanism of FIG. 47 to effect continual tracking of the sun.
Figure 49:
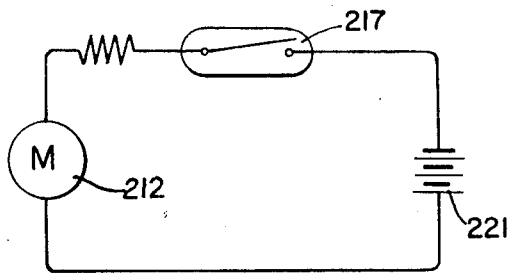
FIG. 49 is a diagrammatic illustration of a thermally responsive focus correction circuit used to effect adjustment of the concentrator panel to correct for azimuthal variations of the sun.

The motors 212 and 213 are controlled by sensing cells which in the embodiment shown in FIGS. 47 and 48 may be bimetallic switches 217, 218 and 219 arranged as shown under the oven frame in position to respond to shifts in the heat zone focused thereunder due to azimuthal and elevational variations in the position of the sun. The control circuits linking the motors to their respective batteries 221 and 222 and bimetallic switches are shown in FIGS. 49 and 50, wherein like reference numbers have been applied to corresponding elements of the circuits.

Inasmuch as the sun always travels from east to west, there is no complication concerning the direction of rotation of motor 212. Accordingly, a simple circuit such as shown in FIG. 49, utilizing a solitary low-cost single pole–single throw switch 217 has given satisfactory results.

In the case of compensation for elevation of the sun, the problem is more complicated because the sun may be either rising (requiring a clockwise rotation of the sleeve 201) or it may be declining, in which case the sleeve 201 must be turned in a counterclockwise direction. To accomplish such a reversal, the motor 213 is preferably a reversible DC motor, with reversal being effected by a reversal of the polarity in the applied voltage.

Figure 50:
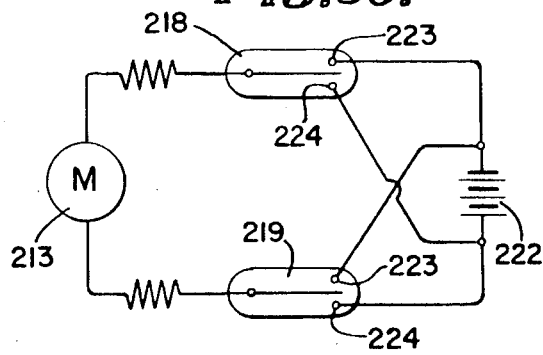
FIG. 50 is a diagrammatic illustration of a thermally responsive focus correction circuit utilized to automatically adjust the concentrator panel in tracking the elevation of the sun.

The circuit shown in FIG. 50 accomplishes such reversal when required. In this circuit, as distinguished from the circuit shown in FIG. 49, the switches 218 and 219 are single pole–double throw-type switches, each having "cold" and "hot" terminals 223 and 224, respectively.

With this arrangement, voltage of a negative polarity is applied to the motor 213 when terminal 223 of switch 218 is "hot" and terminal 224 of switch 219 is "cold." In no other combination of switch positions is a negative polarity applied to the motor.

Conversely, when terminal 223 of switch 218 is "cold" and terminal 224 of switch 219 is "hot," then a voltage of positive polarity is applied to the motor. In no other combination of positions is a positive polarity applied to the motor.

The tracking control system operates as follows: the concentrator panel or panels are focused in the morning so that the heat zone is confined within the perimeter of the radiant-energy-absorbing device or hot plate. Azimuthal and elevational movement of the sun causes the heat zone to gradually shift its position generally toward the left rear corner of the hot plate. When a predetermined amount of shift of the heat zone has occurred, the heat rays will impinge upon "cold" switch 217 and switch 218. The former controls compensation for azimuthal variations, while the latter controls compensation for elevational variations. In just a few seconds, the heat from the heat rays will close switch 217, causing motor 212 to activate and rotate the center post in the proper direction so as to refocus the heat zone on the hot plate. When the proper adjustment has been made, the heat-responsive switch 217 opens to break the circuit through the motor.

Correction for elevational variations by the sun are effected in essentially the same manner utilizing switches 218 and 219, which respond to heat rays to switch from "cold" to "hot" positions to control rotation of the motor 213 to effect repositioning of the concentrator panels to compensate for elevational changes in the sun's position.

Figure 51:
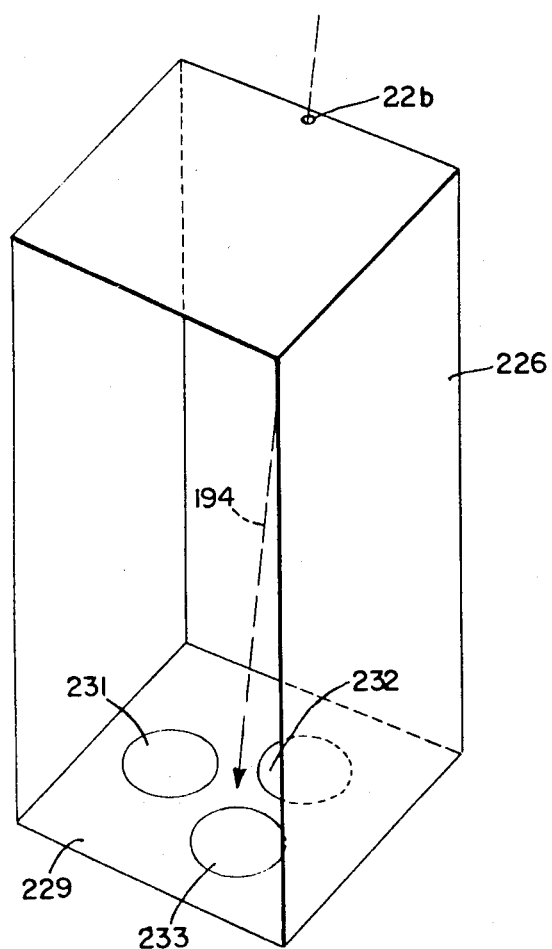
FIG. 51 is a schematic view illustrating an optical tracking cell activated by a light beam and useful in automatically and continually adjusting the position of the concentrator panel in relation to the sun for maximum efficiency.
Figure 52:
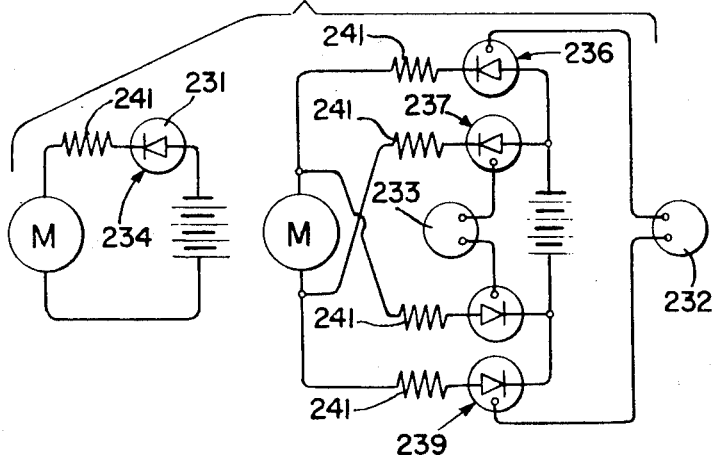
FIG. 52 is a diagrammatic view of a control circuit for use in conjunction with the optical tracking cell of FIG. 51.

FIGS. 51 and 52 illustrate an optical tracking cell 226 (FIG. 51) and a control circuit 227 (FIG. 52) for use in conjunction with the optical tracking cell. In this system the beam of light 194 passes through pinhole 228 and impinges on bottom wall 229. Mounted on the bottom wall along a track or path to be traversed by the light beam are three light-sensitive photocells 231, 232 and 233. As shown in FIG. 52, the photocells are connected in the bias circuits of five transistors 234, 236, 237, 238 and 239. Appropriate current-limiting resistors 241 are also interposed in the circuit as shown. When the light beam impinges on the photocells, the transistors associated therewith are biased to "ON" condition and current is supplied to the motors 212 and 213 so as to correct the focus of the concentrator panel for maximum efficiency.

Figure 53:
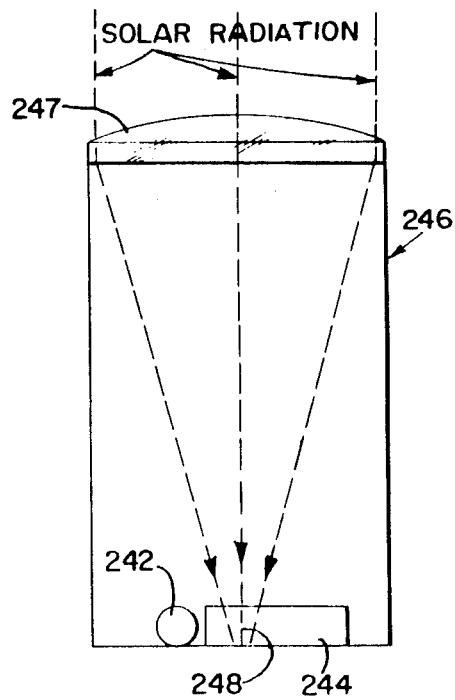
FIG. 53 is a schematic illustration of a different thermal tracking cell used in conjunction with magnified radiations from the sun impinging on heat-sensitive switches to maintain the concentrator panel in an optimum position with respect to radiations from the sun.
Figure 54:
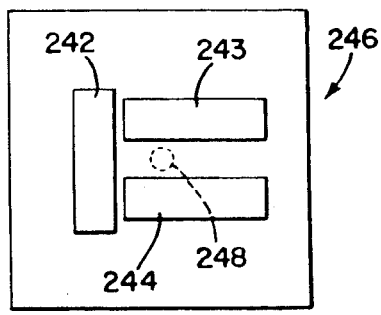
FIG. 54 is a schematic in plan of the thermal tracking cell illustrated in FIG. 53.

In FIGS. 53 spot 54, heat-sensitive bimetallic switches 242, 243 and 244 are used in a tracking cell 246 having a lens 247 at its upper end effective to focus the sun's rays on the switches. The lens focuses about 1 square inch of solar radiation down to a spot about one-tenth of an inch in diameter. In practice it has been found that such an arrangement will actuate a switch set for 225° F. within 14 seconds. Removal of the focused heat energy from the switch after 30 seconds results in opening of the normally open switch within 9 seconds. It has been found that the time delay inherent when bimetallic switches are used is an advantage in that such time delay reduces the frequency with which the motors need to actuated.

From the foregoing it will be apparent that the solar-concentrating device of the invention has taken devices of this type out of the laboratory and into the practical world of utility for many purposes at reasonable cost. When considered as a primary source of heat energy, the solar reflector-concentrator device of the invention may be used in conjunction with many different heat-utilization devices adapted to be easily attached and detached to the basic reflector-concentrator device.

Figure 12:
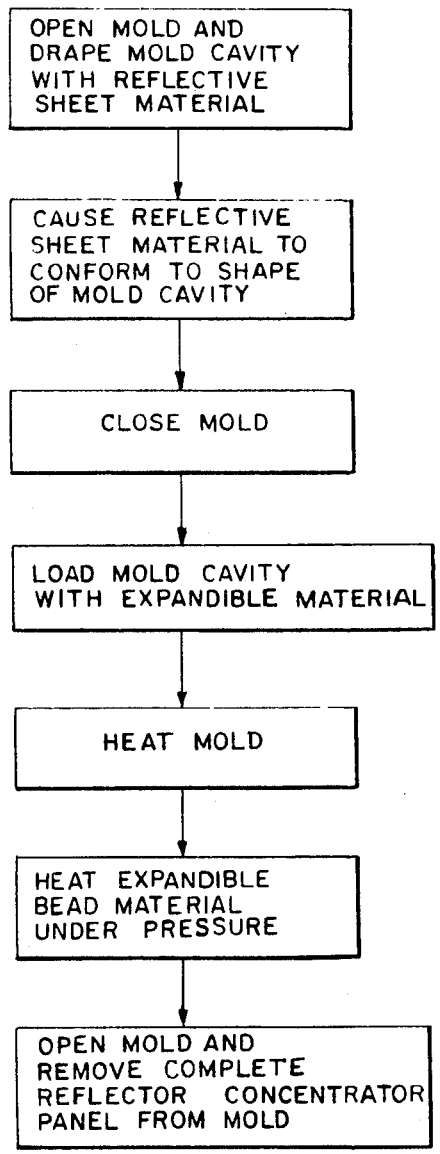
FIG. 12 is a diagram illustrating the steps to be followed in fabricating the reflector-concentrator panel.
Figure 16:
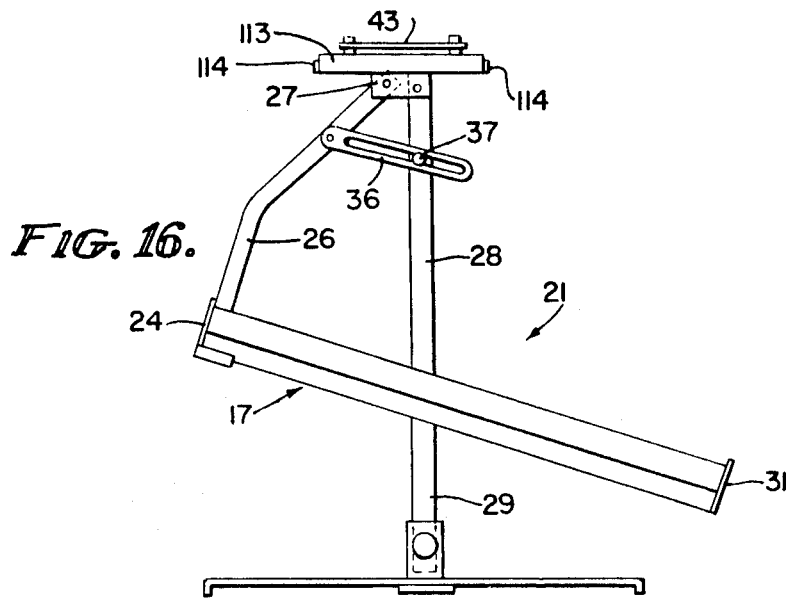
FIG. 16 is a side elevation of the solar range illustrated in FIG. 13.
Figure 17:
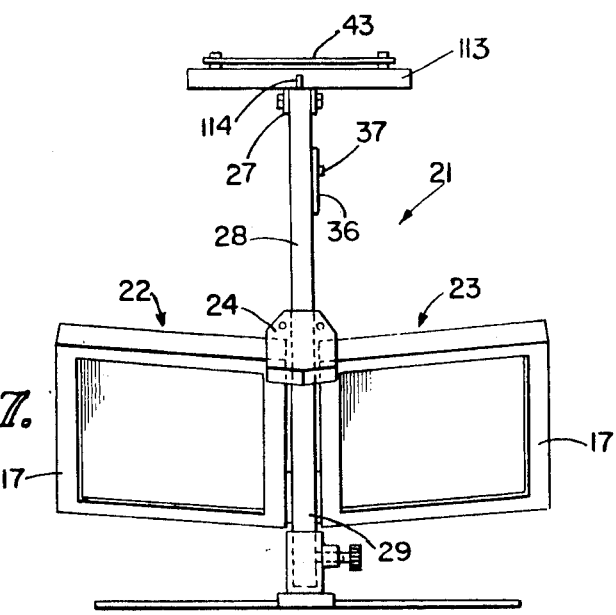
FIG. 17 is a rear elevation of the solar range illustrated in FIG. 13.
Figure 18:
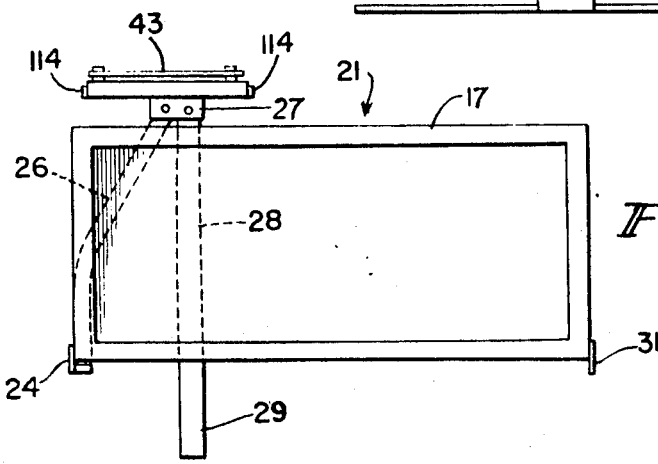
FIG. 18 is a side elevation of the solar range of FIG. 13 shown in collapsed form.

The success or failure of a new product is oftentimes determined by the cost of manufacture. In this connection, and referring specifically to FIGS. 11 and 12, the preferred method and apparatus for producing the reflector-concentrator panel includes a mold designated generally by the numeral 251 and including a top closure member 252 adapted to fit snugly on a cavity portion 253. The cavity portion is formed with an internal cavity 254 one surface 256 of which is formed with a multiplicity of angularly disposed surface portions 257 adapted to properly shape the reflecting surface of the reflector-concentrator panel.

When it is desired to manufacture the concentrator panel from expandable-bead material, the cover plate 252 is provided with a multiplicity of channels 258 for the passage of a heating medium such as superheated steam. Such passageways communicate with similar passageways 258' formed in the cavity portion of the mold. A relatively large diameter central opening connected by an appropriate conduit 259 provides means for admitting the expandable-bead material to the cavity of the mold after the mold has been closed. Inlet and outlet ports 261 and 262, respectively, provide for the admission and escape, respectively, of a heating medium to the interior of the cavity to effect expansion of the expandable-bead material within the cavity. Such heating medium may be in the form of steam at a temperature of about 250° F. and admitted to the cavity under a pressure of approximately 30 pounds per square inch.

Prior to charging the mold cavity with the expandable-bead material, the surface 256 of the mold is draped with a suitable layer of reflective material such as one of the products previously discussed. To insure that the reflective film will conform in configuration to the angular disposition of surfaces 257 of the mold cavity, the interior of the mold cavity and the individual surfaces 257 are connected by a multiplicity of small diameter passageways 263 with a manifold chamber 264 connected by a suitable conduit 266 to a vacuum pump or other device or system for reducing the pressure within manifold 264 to an amount less than atmospheric.

With the reflective sheet draped within the cavity, it will be seen that the imposition of a negative pressure in manifold 264 will suck the sheet into close conformity with the configuration of surface 256 of the cavity. When the cavity is then charged with expandable-bead material, and heat in the form of steam admitted to the cavity, the pressure of the steam and the pressure of the expanding bead material will insure that a close physical contact will exist between the reflective sheet and the expandable-bead substrate.

In terms of steps, the mold is first opened to permit draping of the interior surface 256 of the cavity with the reflective material. A vacuum is then pulled on manifold 264 to suck the reflective material into conformity with surface 256. Such conformity may either be observed through ocular observation, or a plug having a complementary configuration may be inserted into the open mold to force close conformation of the reflective sheet to the surface 256. In most cases however it will be sufficient to suck the reflective material into its final position. A suitable heat- or pressure-sensitive adhesive may be applied to insure that the reflective sheet will adhere to the substrate.

The mold is then closed and sealed through conventional techniques, and heated to a predetermined temperature by passage of a heating medium through the passages 258—258'. Preexpanded bead material, such as expandable-bead polystyrene is then admitted to the cavity of the mold through conduit 259. Such expandable-bead material may be blown in through utilization of a stream of air until the cavity is completely full of such expandable-bead material. The air of course escapes through ports 261 and 262 during the filling process. When it is determined that the mold cavity has been filled with expandable-bead material, the inlet port 259 for such material is plugged by suitable means and a heating medium such as steam at 250° F. and under a pressure of approximately 30 pounds per square inch is admitted through inlet port 261.

Inasmuch as the expandable beads at this stage in the conformation of the reflector-concentrator panel are individual entities, the steam passes between the expandable beads so as to heat the entire mass. The diameter of outlet or exhaust port 262 is gauged or controlled so as to maintain the appropriate pressure and temperature within the mold cavity. Such temperature and pressure is maintained for such period as is necessary to cause the entire mass of expandable-bead material to expand and fill the entire cavity. The heating medium is then interrupted and the mold opened to remove the finished product.

To facilitate removal of the finished product is may be desirable to reverse the cycle of the vacuum pump or other pump mechanism to cause a positive pressure within the manifold 264 and thus release the finished reflector-concentrator panel from the cavity. At this stage in its construction, the substrate for the reflector-concentrator panel is inserted in an appropriate frame and mounted as previously discussed.

Having thus described my invention, what is claimed to be novel and sought to be protected by letters patent is as follows:

1. A solar-energy-concentrating device comprising:
   a. a reflector-concentrator panel including a reflective surface having a longitudinal (X) dimension and a transverse (Y) dimension;
   b. a support frame to support the reflector-concentrator panel in position to intercept and reflect solar radiations;
   c. and a radiant-energy-absorbing device operatively associated with the frame and upon which the reflected solar radiations are focused, said radiant-energy-absorbing device being spatially related to said reflector-concentrator panel so that the shadow cast by said radiant-energy-absorbing device normally does not fall upon the reflective surface of said reflector-concentrator panel;
   d. and means interposed between said radiant-energy-absorbing device and said support frame to maintain said radiant-energy-absorbing device horizontal.

2. A solar-energy-concentrating device comprising:
   a. a reflector-concentrator panel including a reflective surface having a longitudinal (X) dimension and a transverse (Y) dimension;
   b. a support frame to support the reflector-concentrator panel in position to intercept and reflect solar radiations;
   c. and a radiant-energy-absorbing device operatively associated with the frame and upon which the reflected solar radiations are focused, said radiant-energy-absorbing device being spatially related to said reflector-concentrator panel so that the shadow cast by said radiant-energy-absorbing device normally does not fall upon the reflective surface of said reflector-concentrator panel;
   d. said reflector-concentrator panel, said radiant-energy-absorbing device and said support frame being pivotally interconnected and selectively collapsible into a compact package.

3. A solar-energy-concentrating device comprising:
   a. a reflector-concentrator panel including a reflective surface having a longitudinal (X) dimension and a transverse (Y) dimension;
   b. a support frame to support the reflector-concentrator panel in position to intercept and reflect solar radiations;
   c. and a radiant-energy-absorbing device operatively associated with the frame and upon which the reflected solar radiations are focused, said radiant-energy-absorbing device being spatially related to said reflector-concentrator panel so that the shadow cast by said radiant-energy-absorbing device normally does not fall upon the reflective surface of said reflector-concentrator panel;
   d. and means thermally insulating at least one surface of said radiant-energy-absorbing device from the ambient atmosphere.

4. The combination according to claim 3, in which said reflector-concentrator panel constitutes a generally rectangular slab of material a surface portion of which is formed with a multiplicity of transversely extending steps, the primary face of each said step being angularly disposed to the primary face of an adjacent step, and a thin reflective film draped over said slab so as to conform to said steps to provide a multiplicity of separate reflective surfaces the degree of convergence of radiant energy reflected therefrom being in the order of magnitude of from 6 to 12:1.

5. The combination according to claim 3, in which said reflector-concentrator panel comprises a relatively flat slab of material the reflective surface of which is provided with a multiplicity of indentations arranged in two groups on opposite sides of a median plane, the indentations of each group ranging from a relatively shallow indentation adjacent said median plane to a relatively deep indentation adjacent the end of said slab.

6. The combination according to claim 3, in which said reflector-concentrator panel constitutes a monolithic slab of expandable-bead type material, one surface of which is formed to provide a pair of aligned series of transversely extending and longitudinally recurrent angularly disposed stepped surfaces, in each series the angular disposition of the stepped surfaces being such that corresponding stepped surfaces adjacent opposite ends of the reflector-concentrator panel reflect radiant energy from the sun to a common surface area on said radiant-energy-absorbing device.

7. The combination according to claim 3, in which said radiant-energy-absorbing device includes a relatively flat plate suspended on said support frame so that the plate is normally disposed in a horizontal plane during use.

8. The combination according to claim 3, in which said radiant-energy-absorbing device comprises a relatively flat plate suspended on said frame, and means are detachably secured adjacent said flat plate on the side thereof next adjacent said reflector-concentrator panel forming a transparent window through which said solar radiations pass to reach said flat plate.

9. The combination according to claim 3, in which said radiant-energy-absorbing device includes a frame member, and a flat plate thermally insulated from the frame member and supported thereon to absorb said solar radiations focused thereon.

10. The combination according to claim 3, in which said radiant-energy-absorbing device includes a frame member, a flat plate detachably supported on one side thereof to absorb solar radiations focused thereon, and a transparent window detachably supported on the other side of said frame to thermally insulate the flat plate from the ambient atmosphere.

11. The combination according to claim 3, in which said radiant-energy-absorbing device includes a flat plate supported on the support frame in position to absorb solar radiations focused thereon, a transparent window supported adjacent one side of said plate to shield the associated side of the plate from the ambient atmosphere, and an enclosure supported adjacent the opposite side of said flat plate from the transparent window to shield said opposite side thereof from the ambient atmosphere.

12. The combination according to claim 3, in which said support frame includes an auxiliary brace one end of which is adjustably pivoted to said support frame and the other end of which is pivotally attached to said reflector-concentrator panel.

13. The combination according to claim 3, in which said support frame includes an auxiliary brace one end of which is pivotally connected to said support frame intermediate its ends, and the other end of which is adjustably connected to said reflector-concentrator panel intermediate its ends, one end of said reflector-concentrator panel being pivotally attached to said support frame adjacent one end thereof.

14. The combination according to claim 3, in which said support frame includes a first U-shaped member, a second U-shaped member, brace means interposed between said U-shaped members, and means interposed between said support frame, brace means and reflector-concentrator panel operable to selectively collapse the support frame, brace means and reflector-concentrator panel into a flat package.

15. The combination according to claim 3, in which said support frame includes a main support post adapted to be supported in an upright position, brace means angularly disposed with respect to said main support post so that said brace means lies in substantially the same plane with said main support post, means adjustably connecting the lower end of said brace means with said main support post intermediate its ends and with one end of the reflector-concentrator panel, the other end of said reflector-concentrator panel being supported adjacent the lower end of said brace means.

16. The combination according to claim 3, in which said means for thermally insulating at least one surface of said radiant energy absorbing device comprises a window transparent to solar radiations interposed between said radiant-energy-absorbing device and said reflector-concentrator panel.

17. The combination according to claim 3, in which said means for thermally insulating at least one surface of said radiant-energy-absorbing device comprises an enclosure mounted on the side of said radiant-energy-absorbing device remote from said reflector-concentrator panel.

18. The combination according to claim 3, in which said means for thermally insulating said radiant-energy-absorbing device from the ambient atmosphere includes a window transparent to solar radiations detachably interposed between said radiant-energy-absorbing device and said reflector-concentrator panel, and an enclosure mounted in association with the surface of said radiant-energy-absorbing device remote from said transparent window.

19. The combination according to claim 4, in which said thin reflective film draped over said slab comprises a thin film of synthetic resinous material sufficiently pliable to conform to the configuration of said transversely extending steps, and a thin layer of reflective metal on said film of synthetic resinous material effective to intercept and reflect said solar radiations.

20. The combination according to claim 5, in which corresponding indentations on opposite sides of said median plane are angularly disposed so that radiant energy from the sun incident thereupon is reflected onto a common surface area on said radiant-energy-absorbing device.

21. The combination according to claim 6, in which the width of the beam in the longitudinal (X) dimension measured at the radiant-energy-absorbing device approximates the width of one of said stepped surfaces of the reflector-concentrator panel.

22. A solar-energy-concentrating device comprising:
a. a reflector-concentrator panel including a reflective surface having a longitudinal (X) dimension and a transverse (Y) dimension;
b. a support frame to support the reflector-concentrator panel in position to intercept and reflect solar radiations;
c. and a radiant-energy-absorbing device operatively associated with the frame and upon which the reflected solar radiations are focused, said radiant-energy-absorbing device being spatially related to said reflector-concentrator panel so that the shadow cast by said radiant-energy-absorbing device normally does not fall upon the reflective surface of said reflector-concentrator panel;
d. said radiant-energy-absorbing device including a relatively flat plate suspended on said frame, and means are detachable superimposed over said flat plate to define an oven enclosure.

23. The combination according to claim 22, in which said means detachably superimposed over said flat plate to define an oven enclosure comprises a sheet of material having high resistance to thermal conductivity folded to form a hollow body supportable in association with said radiant-energy-absorbing device to enclose one surface thereof.

24. A solar-energy-concentrating device comprising:
a. a reflector-concentrator panel including a reflective surface having a longitudinal (X) dimension and a transverse (Y) dimension;
b. a support frame to support the reflector-concentrator panel in position to intercept and reflect solar radiations;
c. and a radiant-energy-absorbing device operatively associated with the frame and upon which the reflected solar radiations are focused, said radiant-energy-absorbing device being spatially related to said reflector-concentrator panel so that the shadow cost by said radiant energy absorbing device normally does not fall upon the reflective surface of said reflector-concentrator panel;
d. said reflective surface including at least two reflective surface portions, one of said reflective surface portions being associated with one end of the reflector-concentrator panel and the other reflective surface portion being associated with the opposite end of the reflector-concentrator panel;
e. said reflective surface portions being inclined in opposite directions.

25. A solar-energy-concentrating device comprising:
a. a reflector-concentrator panel including a reflective surface having a longitudinal (X) dimension and a transverse (Y) dimension;
b. a support frame to support the reflector-concentrator panel in position to intercept and reflect solar radiations;
c. and a radiant-energy-absorbing device operatively associated with the frame and upon which the reflected solar radiations are focused, said radiant-energy-absorbing device being spatially related to said reflector-concentrator panel so that the shadow cast by said radiant-energy-absorbing device normally does not fall upon the reflective surface of said reflector-concentrator panel;

d. said reflector-concentrator panel comprising a pair of reflective surfaces arranged in side-by-side relation and arranged so that solar radiations reflected from both said reflective surfaces are focused upon said radiant-energy-absorbing device;

e. and a pair of radiant-energy-absorbing devices each associated with one of said pair of reflective surfaces.

26. A solar-energy-concentrating device comprising:

a. a reflector-concentrator panel including a reflective surface having a longitudinal (X) dimension and a transverse (Y) dimension;

b. a support frame to support the reflector-concentrator panel in position to intercept and reflect solar radiations;

c. and a radiant-energy-absorbing device operatively associated with the frame and upon which the reflected solar radiations are focused, said radiant-energy-absorbing device being spatially related to said reflector-concentrator panel so that the shadow cast by said radiant-energy-absorbing device normally does not fall upon the reflective surface of said reflector-concentrator panel;

d. said reflector-concentrator panel comprising a pair of reflective surfaces arranged in side-by-side relation and arranged so that solar radiations reflected from both said reflective surfaces are focused upon said radiant-energy-absorbing device;

e. said pair of reflective surfaces being normally adapted to be focused on adjacent areas of said radiant-energy-absorbing device, and means for adjusting said reflective surfaces so that both reflective surfaces are focused in superposed relation upon a common area of said radiant-energy-absorbing device.

27. A solar-energy-concentrating device comprising:

a. a reflector-concentrator panel including a reflective surface having a longitudinal (X) dimension and a transverse (Y) dimension;

b. a support frame to support the reflector-concentrator panel in position to intercept and reflect solar radiations;

c. and a radiant-energy-absorbing device operatively associated with the frame and upon which the reflected solar radiations are focused, said radiant-energy-absorbing device being spatially related to said reflector-concentrator panel so that the shadow cast by said radiant-energy-absorbing device normally does not fall upon the reflective surface of said reflector-concentrator panel;

d. and means adjustably interconnecting said reflector-concentrator panel and support frame and selectively operable to adjust the position of the reflector-concentrator panel in relation to the sun;

e. said means adjustably interconnecting said reflector-concentrator panel and support frame including means for tracking the sun in its azimuthal and elevational variations in position, and means responsive to said tracking means to effect automatic adjustment of the reflector-concentrator panel in relation to movement of the sun.

28. A solar-energy-concentrating device comprising:

a. a reflector-concentrator panel including a reflective surface having a longitudinal (X) dimension and a transverse (Y) dimension;

b. a support frame to support the reflector-concentrator panel in position to intercept and reflect solar radiations;

c. and a radiant-energy-absorbing device operatively associated with the frame and upon which the reflected solar radiations are focused, said radiant-energy-absorbing device being spatially related to said reflector-concentrator panel so that the shadow cast by said radiant-energy-absorbing device normally does not fall upon the reflective surface of said reflector-concentrator panel;

d. and means rotatably supporting said support frame for rotation about a vertical axis;

e. said means for rotatably supporting said support frame comprising a collapsible pedestal including a pair of relatively rotatably members selectively adjustable into cruciform relationship when in use and adjustable into axial alignment when not in use, and a socket member mounted on said pedestal engageable by a depending portion of said support frame.

29. A solar-energy-concentrating device comprising:

a. a reflector-concentrator panel including a reflective surface having a longitudinal (X) dimension and a transverse (Y) dimension;

b. a support frame to support the reflector-concentrator panel in position to intercept and reflect solar radiations;

c. and a radiant-energy-absorbing device operatively associated with the frame and upon which the reflected solar radiations are focused, said radiant-energy-absorbing device being spatially related to said reflector-concentrator panel so that the shadow cast by said radiant-energy-absorbing device normally does not fall upon the reflective surface of said reflector-concentrator panel;

d. and means rotatably supporting said support frame for rotation about a vertical axis;

e. said means for rotatably supporting said support frame comprising a pointed stake adapted to be driven into the ground, a flange on the stake for limiting penetration of said stake into the ground, a bearing shoulder on said stake adjacent said flange engageable by said frame, and a head mounted on said stake spaced from and cooperating with said bearing shoulder to rotatably support said frame member.

30. A solar-energy-concentrating device comprising:

a. a reflector-concentrator panel including a reflective surface having a longitudinal (X) dimension and a transverse (Y) dimension;

b. a support frame to support the reflector-concentrator panel in position to intercept and reflect solar radiations;

c. and a radiant-energy-absorbing device operatively associated with the frame and upon which the reflected solar radiations are focused, said radiant-energy-absorbing device being spatially related to said reflector-concentrator panel so that the shadow cast by said radiant-energy-absorbing device normally does not fall upon the reflective surface of said reflector-concentrator panel;

d. and means rotatably supporting said support frame for rotation about a vertical axis;

e. said means for rotatably supporting said support frame comprising an elongated stake having a cylindrical mounting portion at one end and a pointed driving portion at the other end adapted to be driven into the sand to support said support frame.

31. A solar-energy-concentrating device comprising:

a. a reflector-concentrator panel including a reflective surface having a longitudinal (X) dimension and a transverse (Y) dimension;

b. a support frame to support the reflector-concentrator panel in position to intercept and reflect solar radiations;

c. and a radiant-energy-absorbing device operatively associated with the frame and upon which the reflected solar radiations are focused, said radiant-energy-absorbing device being spatially related to said reflector-concentrator panel so that the shadow cast by said radiant-energy-absorbing device normally does not fall upon the reflective surface of said reflector-concentrator panel;

d. and means operatively associated with said reflector-concentrator panel manipulable to effect optimum focusing of the reflected radiant energy on the radiant-energy-absorbing device;

e. said means operatively associated with said reflector-concentrator panel to effect optimum focusing of the reflected radiant energy comprising a focusing cell including a U-shaped frame member having a pair of parallel arms one of which is apertured to admit a beam of light and the other of which includes a target thereon upon which the beam of light passing through said aperture impinges when said reflector-concentrator panel is properly positioned in relation to the sun so as to focus the radiant energy therefrom on said radiant-energy-absorbing device.

32. A solar-energy-concentrating device comprising:
a. a reflector-concentrator panel including a reflective surface having a longitudinal (X) dimension and a transverse (Y) dimension;
b. a support frame to support the reflector-concentrator panel in position to intercept and reflect solar radiations;
c. and a radiant-energy-absorbing device operatively associated with the frame and upon which the reflected solar radiations are focused, said radiant-energy-absorbing device being spatially related to said reflector-concentrator panel so that the shadow cast by said radiant-energy-absorbing device normally does not fall upon the reflective surface of said reflector-concentrator panel;
d. and means operatively associated with said reflector-concentrator panel manipulable to effect optimum focusing of the reflected radiant energy on the radiant-energy-absorbing device;
e. said means to effect optimum focusing of the reflected radiant energy including a pair of motors, a control circuit including a source of electrical energy connected to said motors and including a plurality of heat-responsive switches, one of said motors being operatively connected to said reflector-concentrator panel to effect adjustment thereof to compensate for azimuthal variations of the sun and the other of said motors being operatively connected to said reflector-concentrator panel to effect adjustment thereof to compensate for elevational variations in the position of the sun, activation and deactivation of said heat-responsive switches being automatically controlled by variations in the sun's position to effect substantially automatic tracking of the sun by said reflector-concentrator panel.

33. A solar-energy-concentrating device comprising:
a. a reflector-concentrator panel including a reflective surface having a longitudinal (X) dimension and a transverse (Y) dimension;
b. a support frame to support the reflector-concentrator panel in position to intercept and reflect solar radiations;
c. and a radiant-energy-absorbing device operatively associated with the frame and upon which the reflected solar radiations are focused, said radiant-energy-absorbing device being spatially related to said reflector-concentrator panel so that the shadow cast by said radiant-energy-absorbing device normally does not fall upon the reflective surface of said reflector-concentrator panel;
d. and means operatively associated with said reflector-concentrator panel manipulable to effect optimum focusing of the reflected radiant energy on the radiant-energy-absorbing device;
e. said means for effecting optimum focusing of the reflected radiant energy including a pair of motors connected to said reflector-concentrator panel and effective when energized to adjust the position of the reflector-concentrator panel to compensate for azimuthal and elevational variations in the position of the sun, control means including a circuit having a plurality of transistors connected to said motors, and a plurality of light-sensitive photocells in said control circuit mounted in operative association with said reflector-concentrator panel and responsive to a shaft of light to effect biasing of said transistors and actuation of said motors to effect adjustment of said reflector-concentrator panel in correlation to the azimuthal and elevational variations in the position of the sun.

34. A solar-energy-concentrating device comprising:
a. a reflector-concentrator panel including a reflective surface having a longitudinal (X) dimension and a transverse (Y) dimension;
b. a support frame to support the reflector-concentrator panel in position to intercept and reflect solar radiations;
c. and a radiant-energy-absorbing device operatively associated with the frame and upon which the reflected solar radiations are focused, said radiant-energy-absorbing device being spatially related to said reflector-concentrator panel so that the shadow cast by said radiant-energy-absorbing device normally does not fall upon the reflective surface of said reflector-concentrator panel;
d. and means operatively associated with said reflector-concentrator panel manipulable to effect optimum focusing of the reflected radiant energy on the radiant-energy-absorbing device;
e. said means to effect optimum focusing of the reflected radiant energy including a pair of motors operatively connected to said reflector-concentrator panel to effect adjustment thereof to compensate for azimuthal and elevational variations in the position of the sun, a circuit connected to said motors for controlling energization thereof, said circuit including a plurality of heat-responsive switches arranged to operate in response to heat applied thereto, and means including a lens interposed between said heat-responsive switches and the sun to focus the sun's rays selectively on one or the other of said heat-responsive switches in correlation to azimuthal and elevational variations in the position of the sun.

35. As an article of manufacture, a solar-energy-absorbing device for use in conjunction with a solar-energy-concentrating device and comprising:
a. a flat radiant-energy-absorbing plate;
b. a support frame spaced about said plate; and
c. means operatively interposed between said plate and said support frame to detachably interconnect the plate to the support frame and thermally insulate the support frame from the plate;
d. said radiant-energy-absorbing plate being detachably mounted on one side of said support frame, and a radiant energy transparent window detachably mounted on the opposite side of said support frame from said radiant-energy-absorbing plate.

36. The combination according to claim 35, in which said radiant-energy-absorbing plate is rectangular and apertured adjacent each corner, and thermally insulating bushing means are provided extending through each said aperture and thermally insulating said support frame from said plate.

37. The combination according to claim 35, in which said support frame includes a radially inwardly extending flange, said radiant-energy-absorbing plate is detachably mounted on said radially inwardly extending flange, and an enclosure is superimposed over said radiant-energy-absorbing plate and detachably supported on said radially inwardly extending flange.

38. As an article of manufacture, an enclosure for converting a hot plate on which food to be cooked is directly supported into an oven comprising:
a. a hollow body having a top, sidewalls depending from said top, said body on the side thereof opposite said top being open and adapted to be closed by said underlying hot plate, said hollow body being formed from a material having a low coefficient of thermal conductivity.

39. The combination according to claim 38, in which selected areas of said hollow body are provided with punchout areas the peripheries of which are defined over a substantial portion thereof by slits extending through the wall of said hollow body.

40. The combination according to claim 38, in which said hollow body is formed from a flat sheet portions of which are folded to provide said top and sidewalls, and means are provided interposed between selected sections of said sidewalls to retain the hollow body in folded condition.

41. The combination according to claim 38, in which said sidewalls on the edges thereof remote from said top wall are provided with outwardly extending flanges forming an integral portion of the associated sidewall.

42. The combination according to claim 38, in which said hollow body is formed from a flat blank fabricated from a material having a low coefficient of thermal conductivity, score lines formed in said sheet material defining said top and sidewalls, triangular tab means integrally interposed between the end edges of adjacent sidewalls, score means bisecting said triangular tab means, and means joining corresponding pairs of said tab means at opposite ends of said body to the associated end wall thereof.

43. The combination according to claim 40, in which said means retaining said sheet in folded condition constitutes an adhesive applied to selected areas of said sheet and adherent to associated adjacent areas of the sheet to retain the sheet in folded condition.

44. The combination according to claim 40, in which said means for retaining said folded sheet in folded condition includes apertures formed in said sheet in a predetermined pattern so that said apertures register one with the other when said sheet is folded, and brad means detachably retained in said registered apertures to retain the sheet in folded condition.

45. The combination according to claim 38, in which the interior of said hollow body is lined with a heat-reflective material.

46. The combination according to claim 38, in which said hollow body is formed in final configuration from cellulosic material having a low coefficient of thermal conductivity by depositing finely comminuted cellulosic material upon a form conforming to the final configuration of said hollow body to form a mat, treating said mat to render said mat dimensionally stable in its final configuration, and removing the finally configured hollow body from said form.

47. The combination according to claim 46, in which said cellulosic material is applied to said form as an aqueous slurry, and said treatment for effecting dimensional stability of said mat comprises driving the water from said cellulosic material.